(12) United States Patent
Ouyang et al.

(10) Patent No.: US 12,162,575 B2
(45) Date of Patent: Dec. 10, 2024

(54) ENERGY EFFICIENT UNDERWATER INFLATABLE ARRAY USING HYDROFOAM AND WATER SWELLING MATERIAL

(71) Applicant: FLORIDA ATLANTIC UNIVERSITY BOARD OF TRUSTEES, Boca Raton, FL (US)

(72) Inventors: Bing Ouyang, Fort Pierce, FL (US);
Tsung-Chow Su, Boca Raton, FL (US);
Yanjun Li, Fort Pierce, FL (US);
Jordan Thomas, Boca Raton, FL (US)

(73) Assignee: Florida Atlantic University Board of Trustees, Boca Raton, FL (US)

( * ) Notice: Subject to any disclaimer, the term of this patent is extended or adjusted under 35 U.S.C. 154(b) by 694 days.

(21) Appl. No.: 17/226,913

(22) Filed: Apr. 9, 2021

(65) Prior Publication Data

US 2021/0284303 A1    Sep. 16, 2021

Related U.S. Application Data

(63) Continuation-in-part of application No. PCT/US2019/045905, filed on Aug. 9, 2019.
(Continued)

(51) Int. Cl.
*B63C 11/52* (2006.01)
*B29C 64/106* (2017.01)
(Continued)

(52) U.S. Cl.
CPC ............ *B63C 11/52* (2013.01); *B29C 64/106* (2017.08); *B63G 8/22* (2013.01); *B33Y 80/00* (2014.12)

(58) Field of Classification Search
CPC .. E02B 15/06; E02B 15/0814; E02B 15/0857; E02B 15/0871; E02B 15/0878;
(Continued)

(56) References Cited

U.S. PATENT DOCUMENTS 3,598,275 A * 8/1971 Francois .................. B63B 3/13
428/113
3,803,540 A    4/1974 Mar et al.
(Continued)

OTHER PUBLICATIONS

International Search Report for related PCT Application No. PCT/US2019/045905 dated Jun. 15, 2020.
(Continued)

*Primary Examiner* — Frederick L Lagman
(74) *Attorney, Agent, or Firm* — Meunier Carlin & Curfman LLC

(57) ABSTRACT

Underwater Deployable Structures (UDSs) capable of achieving inflation via mechanical pumps, moisture-activated expanding foams, water swelling material, or a hybrid of a mechanical pump and water swelling material. Moisture expanding foams begin as polyurethane-based resins of low viscosity, and react in the presence of water to become solid foam. In their final forms, the foams exist as open- or closed-cell, and vary in strength, elasticity, and rigidity. Water swelling material is also disclosed wherein the water swelling material is capable of achieving expansion numerous (e.g., up to about 250) times its initial volume when in contact with water and can shrink back to its initial volume upon dehydration, making the UDSs reusable. A mechanical pump may optionally be used to assist in initial inflation until the water swelling material reaches full expansion.

16 Claims, 22 Drawing Sheets

Related U.S. Application Data

(60) Provisional application No. 62/743,210, filed on Oct. 9, 2018.

(51) Int. Cl.
*B63G 8/22* (2006.01)
*B33Y 80/00* (2015.01)

(58) Field of Classification Search
CPC ... E02B 15/0885; E02B 15/0892; B63C 11/52
See application file for complete search history.

(56) References Cited

U.S. PATENT DOCUMENTS

| | | | |
|---|---|---|---|
| 3,837,171 | A | 9/1974 | Scurlock |
| 3,859,796 | A * | 1/1975 | Benson ............... E02B 15/08 405/64 |
| 4,102,142 | A * | 7/1978 | Lee ..................... E21B 17/012 405/224.2 |
| 4,333,898 | A | 6/1982 | Schmidtchen |
| 5,020,940 | A * | 6/1991 | Smith ............... E02B 15/0885 405/63 |
| 5,026,736 | A | 6/1991 | Pontiff |
| 5,688,074 | A * | 11/1997 | Schiwek ................. C09K 3/32 405/63 |
| 6,254,445 | B1 | 7/2001 | Jones |
| 2006/0159523 | A1 | 7/2006 | Dixon et al. |
| 2012/0003045 | A1* | 1/2012 | Singleton ............. E02B 15/085 405/63 |
| 2015/0119480 | A1 | 4/2015 | Botrie et al. |
| 2016/0138237 | A1* | 5/2016 | Sentner ............... E02B 15/0885 405/69 |

OTHER PUBLICATIONS

Pedersen, J., "Bi-Manual Dexterous Manipulation for Maritime Explosive Ordnance Disposal", Aerospace & Defense Technology, May 1, 2016.
Ouyang et al., "Compressing Two Ways: The Initial Study of an Underwater Inflatable Co-prime Sonar Array (UICSA)", Proceedings of SPIE, vol. 10658, 2018.
U.S. Appl. No. 12/587,331, filed Sep. 30, 2009.
Sauerbrunn et al., "Thermosets: How to Avoid Incomplete Curing", American Laboratory, https://www.americanlaboratory.com/913-technical-articles/482-thermosets-how-to-avoid-incomplete-curing/, Jan. 1, 2010.

* cited by examiner

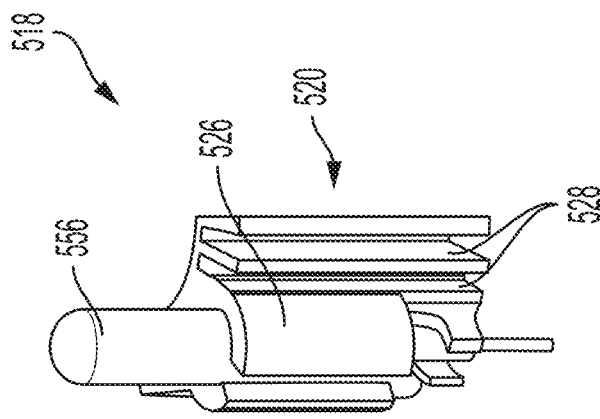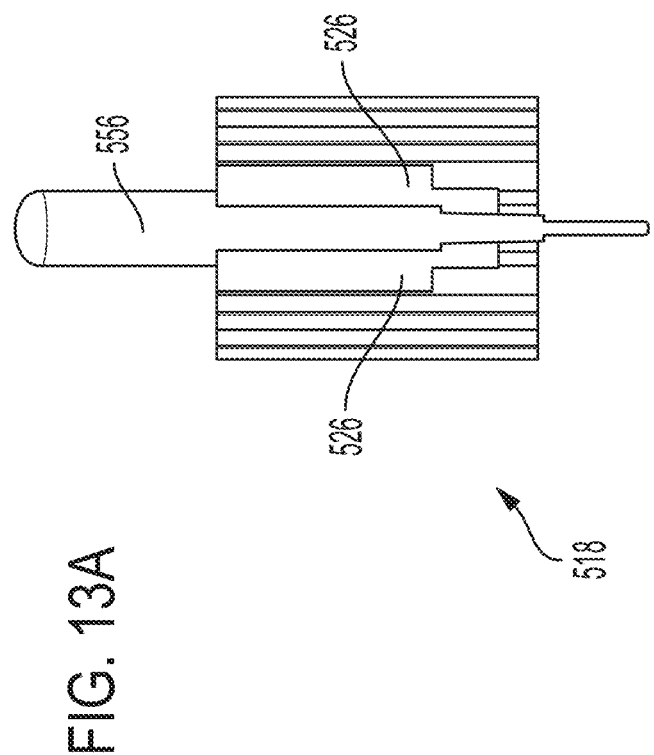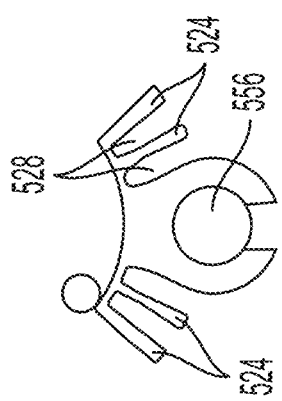

FIG. 19A
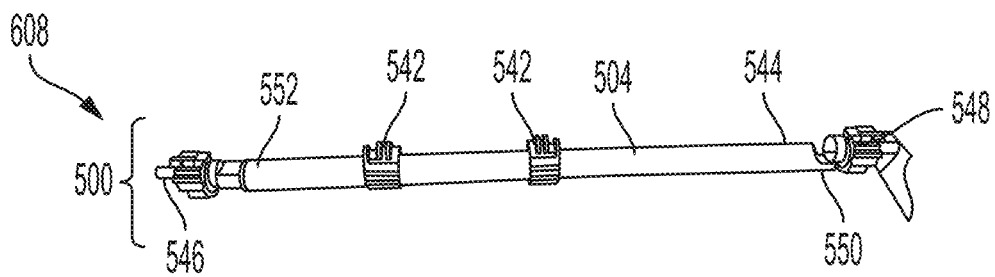
FIG. 19B
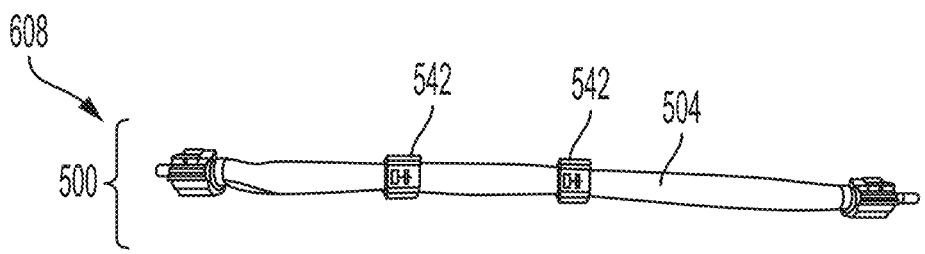
FIG. 19C
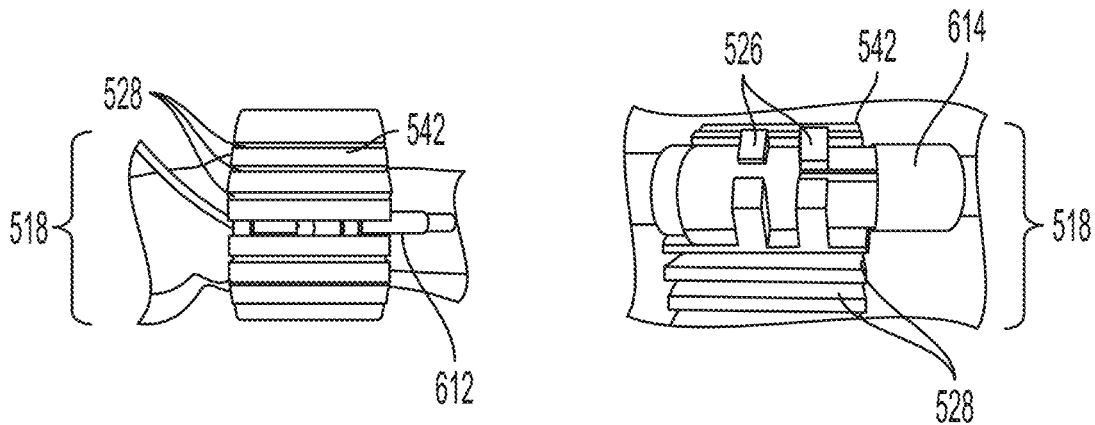
FIG. 19D
FIG. 19E

ENERGY EFFICIENT UNDERWATER INFLATABLE ARRAY USING HYDROFOAM AND WATER SWELLING MATERIAL

CROSS-REFERENCE TO RELATED APPLICATIONS

This application is a Continuation-in-Part of PCT Application No. PCT/US/2019/045905 entitled CHEMICAL REACTION ACTIVATED EXPANDING MATERIAL FOR UNDERWATER DEPLOYABLE STRUCTURES which claims the benefit under 35 U.S.C. § 119(e) of Application Ser. No. 62/743,219 filed on Oct. 9, 2018 entitled CHEMICAL REACTION ACTIVATED EXPANDING MATERIAL FOR UNDERWATER DEPLOYABLE STRUCTURES and whose entire disclosures are incorporated by reference herein.

STATEMENT REGARDING FEDERALLY SPONSORED RESEARCH OR DEVELOPMENT

This invention(s) was made with government support under contract number N00014-18-1-2469 awarded by the Office of Naval Research, and under contract number 1659468 awarded by the National Science Foundation Research Experiences for Undergraduates. The government has certain rights in the invention(s).

FIELD OF DISCLOSURE

The disclosure relates to water or moisture activated materials. In particular, the disclosure relates to water or moisture activated materials, for example water activated expanding foams and water swelling material such as absorbent polymers, deployable in underwater structures.

BACKGROUND

Underwater deployable structure (UDS) has been adopted in many undersea applications including undersea robotics for tasks including Explosive Ordnance Disposal (EOD) and uses including underwater sensor frameworks or supporting structure.

The conventional UDS design has been mechanical using an underwater pump to pressurize and inflate support beams to a desirable shape. This allows for a compact initial form compared with the inflated dimension of a corresponding structure. The structure inflation starts with the activation of the pump to create a pressure differential between the surrounding water and water inside the UDS to maintain the rigidity of the beams. The benefits to this approach are its relative simplicity, and small compressed volume.

However, the need for an underwater pump creates several major drawbacks. First of all it requires an additional power source to drive the pump not only to inflate the structure but also to maintain the rigidity of the structure through the course of the operation or use of the structure. Secondly, the speed of the inflation is dependent on the pump power. This will be a constraint on the system energy requirement. Furthermore, a powerful pump tends to be bulky and increases the initial stowed volume of the UDS.

To help overcome these drawbacks and constraints, the inventors discovered that inflating and supporting UDSs via chemical approaches, such as a chemical reaction may be advantageous in many undersea applications, for example, where an undersea platform has significant size, weight and power (SWaP) constraints such as unmanned underwater vehicles (UUVs) or man-portable remotely operated vehicle (ROVs). The inventors additionally discovered that the use of water swelling material is advantageous in situations where long-term inflation, compact storage, energy conservation, and reusability of the UDS is necessary. Further, the combination of the use of a mechanical pump with the water swelling material approach was found to increase the initial time of expansion and require less energy than a purely mechanical approach once the water swelling material achieved full expansion.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

An approach advocated in this application includes the water or moisture-activated expanding materials, in particular water-activated expanding foams and water swelling materials, such as water absorbent polymers.

Expanding foams are used in the construction industry, for a variety of purposes including sealing, grouting, and structural reinforcement. The inventors determined water- or moisture-activated expanding foams may be applicable because they are designed for use in wet environments and do not deteriorate over a period of days, months or even several years. These foams begin as polyurethane-based resins of low viscosity, and react in the presence of water to become solid foam. For example, the interaction of the molecules in the polymer resin and water molecules initiates a reaction which thickens and solidifies the polymer, and the simultaneous release of carbon dioxide gas creates bubbles which turn the material into solid foam. A variety of water-activated foams exist, varying in their initial and final forms. There are two-part foams that require the mixture of two resins in order to become water-activated; single-part foams that require the addition of a small amount of catalyst to become water-activated; and single-part resins that become foam when mixed with water. In their final forms, the foams exist as open- or closed-cell, and vary in strength, elasticity, and rigidity.

The rapid reaction and curing times, and potential for high strength and rigidity once cured make these foams of particular interest. Many of the foams in cured form are certified drinking water system components ANSI/NSF 61 as safe for contact with potable water. The drawbacks of foams include their low density, which causes them to be buoyant; the cost of the resins, which can be expensive; and the deployment requirements: most require some form of mixing in order to form good quality foam.

The foregoing and/or other aspects and utilities embodied in the present disclosure may be achieved by providing a method of making a foam object for an underwater deployable structure, including depositing a moisture-activated foam substance onto a substrate, the moisture-activated foam substance being expandable in volume from an unexpanded state to an expanded foam, and activating a chemical reaction of the moisture-activated foam substance with moisture to expand the moisture-activated substance in volume to the expanded foam.

According to aspects described herein, a method for underwater deployment of an underwater deployable structure in unexpanded configuration having a plurality of beams coupled together is discussed by example. The beams are mechanically expandable underwater from the unexpanded configuration to an expanded configuration, and have an outer wall with hallowed sections therein defining cavity wells. The method includes inserting a moisture-activated substance located within a cavity well of a first beam, the moisture-activated substance being expandable in volume from an unexpanded state to an expanded foam, and activating a chemical reaction of the moisture-activated substance with moisture to expand the moisture-activated substance in volume to the expanded foam and fill the hallowed section of the cavity well.

According to aspects illustrated herein, an underwater deployable structure buoyance device includes an underwater deployable structure, a buoyance container attached to the underwater deployable structure, and a deployment mechanism. The buoyance container includes moisture-activated substance being expandable in volume from an unexpanded state to an expanded foam via chemical reaction. The deployment mechanism is adjacent the moisture-activated substance and allows moisture to access the moisture-activated substance and chemically react with the moisture-activated substance to expand the moisture-activated substance in volume from the unexpanded state to the expanded foam. The underwater deployable structure is deployable to a first underwater depth with the moisture-activated substance in the unexpanded state. The expanded foam is lighter than water and configured to raise the underwater deployable structure from the first underwater depth to a second underwater depth shallower than the first underwater depth.

Recoverable water swelling materials, particularly water-absorbent polymers, have previously been used in the biomedical field. Many types of water-absorbent polymers exist, such as hygroscopic gel, or hydrogel, a well-known material often found in bead form. The inventors determined water swelling materials may be applicable because of their ability to grow to many times (e.g., more than 50, more than 100, more than 250) their initial size when in contact with water and shrink back to their initial volume when dehydrated. Further, water swelling materials offer the ability to expand at low energy cost and remain at a consistent level of expansion and rigidity while in contact with water, making such materials of particular interest.

The foregoing and/or other aspects and utilities embodied in the present disclosure may be achieved by providing a method of making a water-permeable tubular structure with a water swelling material core for use in an underwater deployable structure. The tubular structure includes an inner layer having a permeable sleeve filled with water swelling material and an outer layer surrounding the permeable sleeve.

According to aspects described herein, a method for underwater deployment of an underwater deployable structure including water-swelling material is discussed by example. The method includes making an underwater deployable structure by depositing water swelling material, for example, water-absorbent polymers, into a permeable sleeve, wherein the permeable sleeve serves as an inner layer of a tubular structure, wherein the tubular structure is permeable to water and permits water to interact with the water-absorbent polymers, and submerging the underwater deployable structure into the water. The water absorbent polymers expand in size and inflate the underwater deployable structure to an increased rigidity after multiple hours of exposure to water.

According to aspects illustrated herein, an underwater deployable structure buoyance device including an underwater deployable structure having a nylon hydrogel-filled permeable sleeve is discussed by example. The device includes a tubular structure made permeable to water having an outer layer and an inner layer including the permeable sleeve. The permeable sleeve is filled with water swelling material such as hydrogel beads and permits water entering the tubular structure to make contact with the beads. They hydrogel beads, upon contact with the water, expand in volume within the permeable sleeve over the course of multiple hours, causing the permeable sleeve to attain increased rigidity. The tubular structure prevents the permeable sleeve from becoming tangled before optimal rigidity is attained.

The foregoing and/or other aspects and utilities embodied in the present disclosure may also be achieved by providing a method of making a water-permeable dual layer tubular structure with a water swelling material core and use of a mechanical pump for use in an underwater deployable structure.

According to aspects described herein, a method for underwater deployment of an underwater deployable structure including a hybrid method of using a dual layer water-permeable tubular structure with a water-swelling material core and a mechanical pump is discussed by example. The method for underwater deployment includes pumping water into an outer layer of a dual layer water-permeable tube with a pump, wherein the outer layer is made of watertight material; attaining the desired rigidity of the underwater deployable structure once the outer layer has filled; permitting water to contact an inner layer of the dual layer water-permeable tubular structure and permeate an inner permeable sleeve fabricated from nylon and containing water swelling material; maintaining the desired rigidity of the underwater deployable structure with the mechanical pump until the water swelling material has expanded to the desired rigidity; and turning off the pump once desired rigidity of the water swelling material has been attained.

According to aspects illustrated herein, an underwater deployable structure buoyance device including a dual layer water-permeable tubular structure with a water swelling material inner layer and a mechanical pump is discussed by example. The device includes a dual layer tubular structure including an inner layer and an outer layer, wherein the inner layer includes a permeable sleeve filled with water swelling material and the outer layer may be made of watertight fabric sealed on both a head and a tail end; a pump, wherein the pump is attached to the tail end of the outer layer and pumps water into the outer layer; and a pressure relief valve, wherein the pressure relief valve is attached at the head end of the outer layer and permits air trapped within the outer layer to exit the outer layer.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and:

FIG. 13A is a top view of an exemplary sensor holder;

FIG. 13B is a front view of the exemplary circular sensor holder of FIG. 13A;

FIG. 13C is an isometric of the exemplary circular sensor holder of FIG. 13A;

FIG. 19A shows a side view of an exemplary UDS filled with water swelling material;

FIG. 19B shows a side view of an exemplary tubular structure of the UDS shown in FIG. 19A;

FIG. 19C shows a side view of the UDS shown in FIG. 19A;

FIG. 19D shows a side view of an exemplary sensor holder;

FIG. 19E is a perspective view of the sensor shown in FIG. 19D;

DETAILED DESCRIPTION

Figure 1:
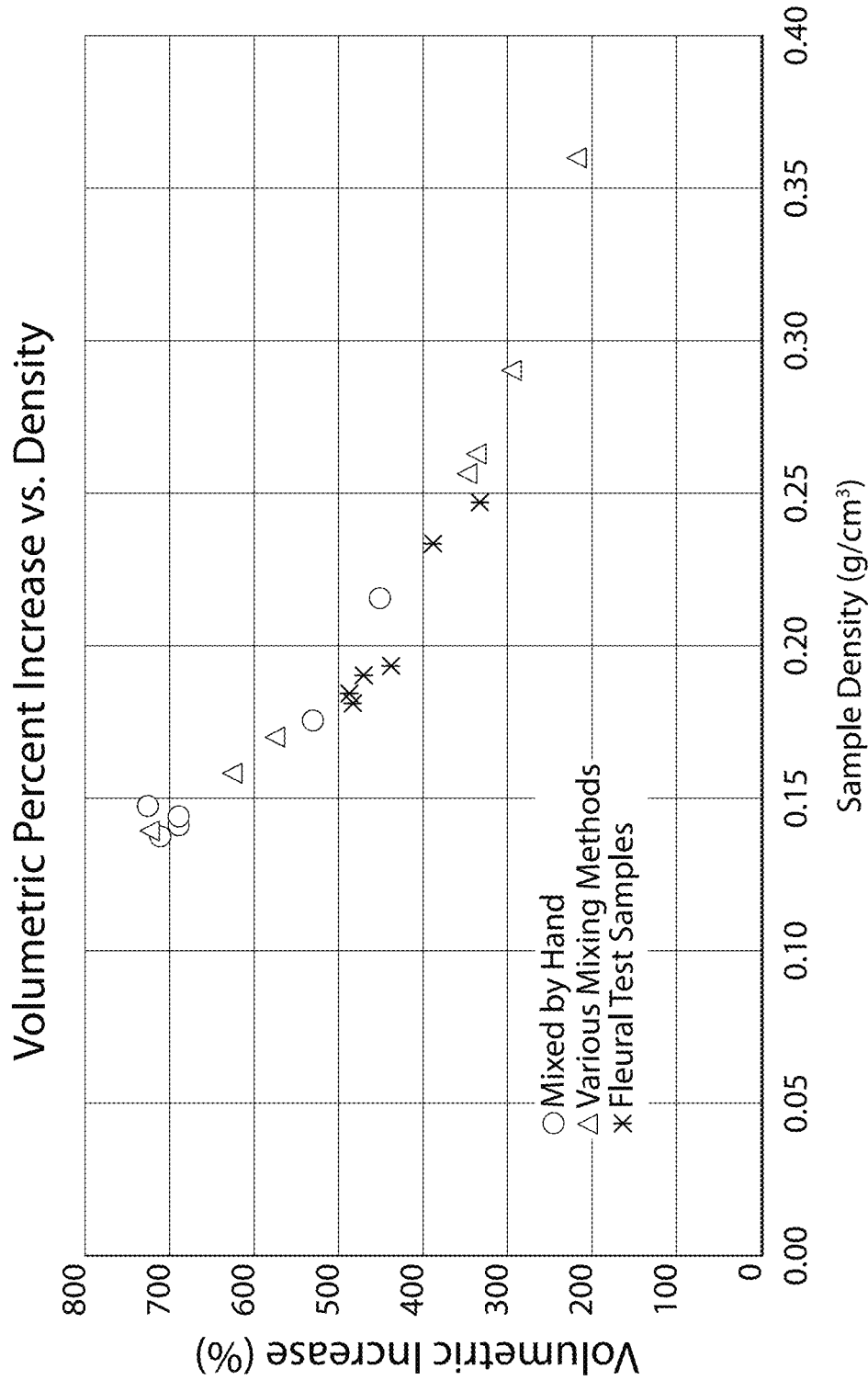
FIG. 1 is a graph showing change in volume vs. final sample density for three examples of samples.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for inking from an inking member to the reimageable surface.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

When referring to any numerical range of values herein, such ranges are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The terms "media", "web", "substrate", "print substrate" and "substrate sheet" generally refers to a usually flexible physical sheet of paper, polymer, Mylar material, plastic, or other suitable physical print media substrate, sheets, webs, molds, etc., for images, whether precut or web fed. The listed terms "media", "print media", "substrate" and "print sheet" may also include woven fabrics, non-woven fabrics, metal films, carbon fiber reinforced material and foils, as readily understood by a skilled artisan. The term substrate may also refer to any supporting structure (e.g., floor, table top, mold, flexible housing, etc.) designed to support or house the expandable foam structures in accordance with the examples.

The term "marking material" as used herein may refer to expandable foam resins or other materials thereof deposited by an image forming device onto a substrate to form foam 3d object image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet expandable foam materials.

The term '3D printer", "image forming device" or "printer" as used herein encompasses any apparatus that performs a 3D print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. A 3D printer can handle sheets, webs, marking materials, and the like. A 3D printer can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In examples the term "array" may refer to a structural framework or arrangement that supports a UDS, and may include the UDS. The array may further include but is not limited to a support skeleton, tubular structure, support beams, tubular beams, molds, containers, rafts, robotic manipulators, buoyance engines, Self-sustained Expandable Structures, framework for underwater inflatable structures and components thereof as discussed herein and known to a skilled artisan. Some components may include sensors, sensor mounting structure, sensor holders, walls or sleeves having outer/inner layers, cavity wells, water swelling material, moisture-activated substance, pumps, valves, substrates and connectors including ropes. In certain examples, the array's buoyancy may be adjustable through approaches including but not limited to adjusting inflation through a mechanical pump, releasing water from the array via an opening (e.g., aperture, permeable substrate, pressure relief valve), controlling exposure of moisture activated substance and water swelling material to water, or dehydrating water swelling material.

The examples further include a machine-readable medium including a plurality of instructions, when executed on a computing device, to implement or perform a method as disclosed herein. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, may be built by successively adding layers so as to form an integral piece, or may be built by adding one or more layers of expandable foam so as to form a 3D structure. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Underwater deployable structures (UDSs), also known as Ocean Morphing Structures, can be compacted and transported into a final form upon arrival at a desired destination. They can be transported in a compacted package by, for example underwater robotics, and then morph into final shapes many times larger than their original volume. UDSs may be made of waterproof fabrics to provide a lightweight, compact solution for underwater uses.

Four different water-activated foam examples, also referred to herein as examples, were obtained as shown in Table 1.

TABLE 1

List and description of foams obtained for testing.
Hydrofoams Tested

| Foam Name | Company | Intended Purpose | Initial Form | Cured Form |
|---|---|---|---|---|
| HF402 | HMI Construction | Lifting and leveling cement slabs and sidewalks | Two-part resin | Rigid, grey |
| AV202 Multigrout | Avanti International | Sealing cracks and leaks with high water flows | Single-part resin | Flexible, dense, closed-cell |
| AV330 Safeguard | Avanti International | Sealing leaks in below-grade or poorly ventilated areas | Single-part resin | Flexible, white |
| AV248 Flexseal | Avanti International | Sealing leaks while maintaining flexibility | Resin + catalyst | Flexible, white |

Initially, the foams were mixed in cups to determine roughly how much volumetric expansion could be expected as well as to observe the general properties of the foams, their reactions, and interactions with water. The HF402 cured to rigid grey foam. The Avanti foams cured to varying levels of density and rigidity, but in general were flexible.

Experiments were designed and performed to study the following properties of interest: expansion time, expansion volume, homogeneity, ability to withstand pressure, ability to expand under pressure, and ability to resist bending.

Once the resins were mixed, it took less than a minute for the reaction to begin. In environments at room temperature between 21° C. and 28° C., the foam expanded and cured within 5 minutes of resins A and B being mixed together.

The inventors found out that the reaction was strongly exothermic: for example, one measurement of the temperature of a reaction was taken. The expanding foam heated up to 290° F. (143° C.), as measured by a thermometer placed in the cup of reacting foam.

The volume and mass of three sets of cured samples as examples were measured. The volumetric expansion was calculated as the percent increase in volume, i.e., change in volume divided by the initial volume, multiplied by 100. In addition, the final density of each sample was calculated from cured mass divided by final measured volume. FIG. 1 is a graph showing the change in volume vs. final sample density for the samples. Samples with larger increases in volume have lower density. As can be seen in FIG. 1, the examples with higher density had a lower amount of expansion. These examples having a higher density are also likely to be stronger, with the trend roughly linear.

Based on the comparison of these results with the examples that each trial produced, as shown in FIG. 1, an expansion ratio above 700% may be the upper limit of what can be achieved in an inflating UDS. An expansion ratio of above 200%, or above 500%, or above 1000%, or above 25000% may be possible. It is possible that with variation on the cylinderness ratio or shape of the tubular beams and on the volume of foam produced at a time that the expansion which results in a fully filled and structurally sound beam segment might also vary.

The foam's ability to withstand pressure was tested with examples mixed in air then expanded and cured in water. These examples were then taken to pressures simulating up to 3000 ft of depth.

A chamber pressurized with water was used. The internal chamber space was a cylinder with radius 65 mm and height 130 mm. A hand-powered pump was used to increase and adjust the pressure.

In the first type of test, Example A (V=150 mL, m=26.6 g, D=40-43 mm) was slowly taken to 350 ft (about 150 psi) and held there until it was observed to sink. This occurred after 2 minutes. The entry valve was closed and the pressure in the chamber observed to decrease slowly, suggesting that the example was compressing or absorbing water. The rate of this change was recorded: pressure dropped by 22 psi (50 ft) in 10 minutes (2.2 psi/min); then 4 psi (10 ft) in 3 minutes (1.3 psi/min); then 8.6 psi (20 ft) in 10 minutes (0.86 psi/min). At this point, the chamber was slowly depressurized and the example removed after a total of 25 minutes. Its final mass was 113.2 g, increased by 86.6 g during the trial due to accumulation of water in the foam's porous structure. This shows that the pressure drop in the chamber was due to water absorption, not compression.

In the second test, Example B (V=150 mL, m=21.5 g) was first pressurized to approximately 130 psi (300 ft) and held at this pressure for 3 minutes, during which the gage indicated that pressure was decreasing slightly in the vessel. The entry valve was closed and five minutes elapsed. During the following 3 minutes, the pressure dropped 4 psi (10 ft). The valve was opened and pressure was then slowly increased to 350 ft, at which point the example sank to the bottom of the chamber. Over the next 4 minutes valve was again closed and pressure dropped 4 psi (10 ft). It was then gradually taken to 1200 psi (about 3000 ft). The example was submerged for a total of 40 minutes. Volume upon extraction: 150 mL, m=108.6 g. The change in mass was due to the absorption of water.

No significant deformation was observed in the examples but the structures took on water and sank. Deformation was evaluated by looking through the observation window to the example lying on reference markings at the bottom of the chamber, with no noticeable reduction in length or diameter being seen. It is conjectured that the depth and rapidity of the sinking of the example was dependent on the time elapsed and the pressure it was subjected to.

However, the most important observation is that the initial and final volumes of the examples were not measured to be significantly different. Therefore, the behavior noted in this experiment suggests that structures made with HF402 may withstand significant water depth.

Figure 2:
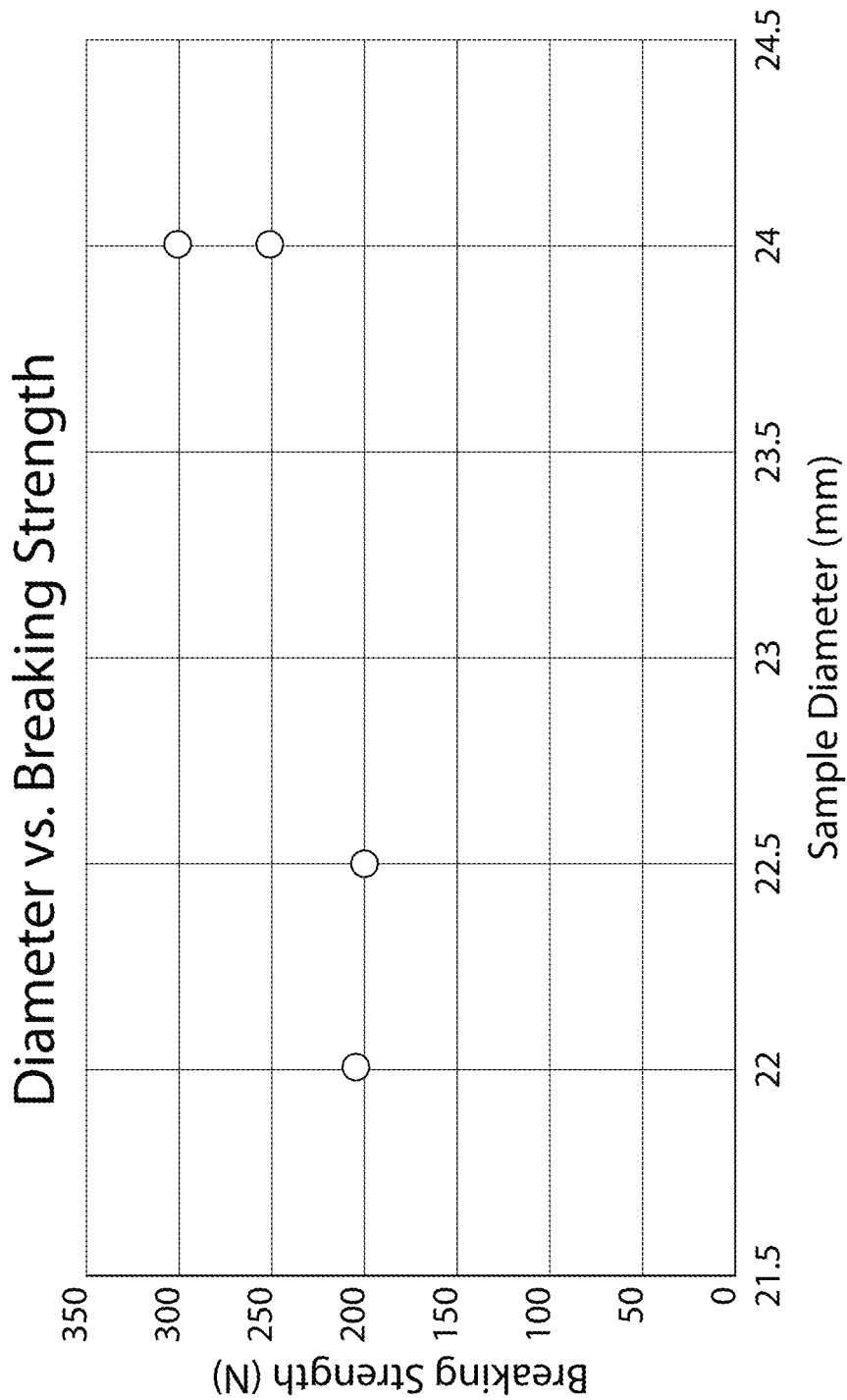
FIG. 2 is a graph showing a relationship between diameter and breaking strength of examples.
Figure 3:
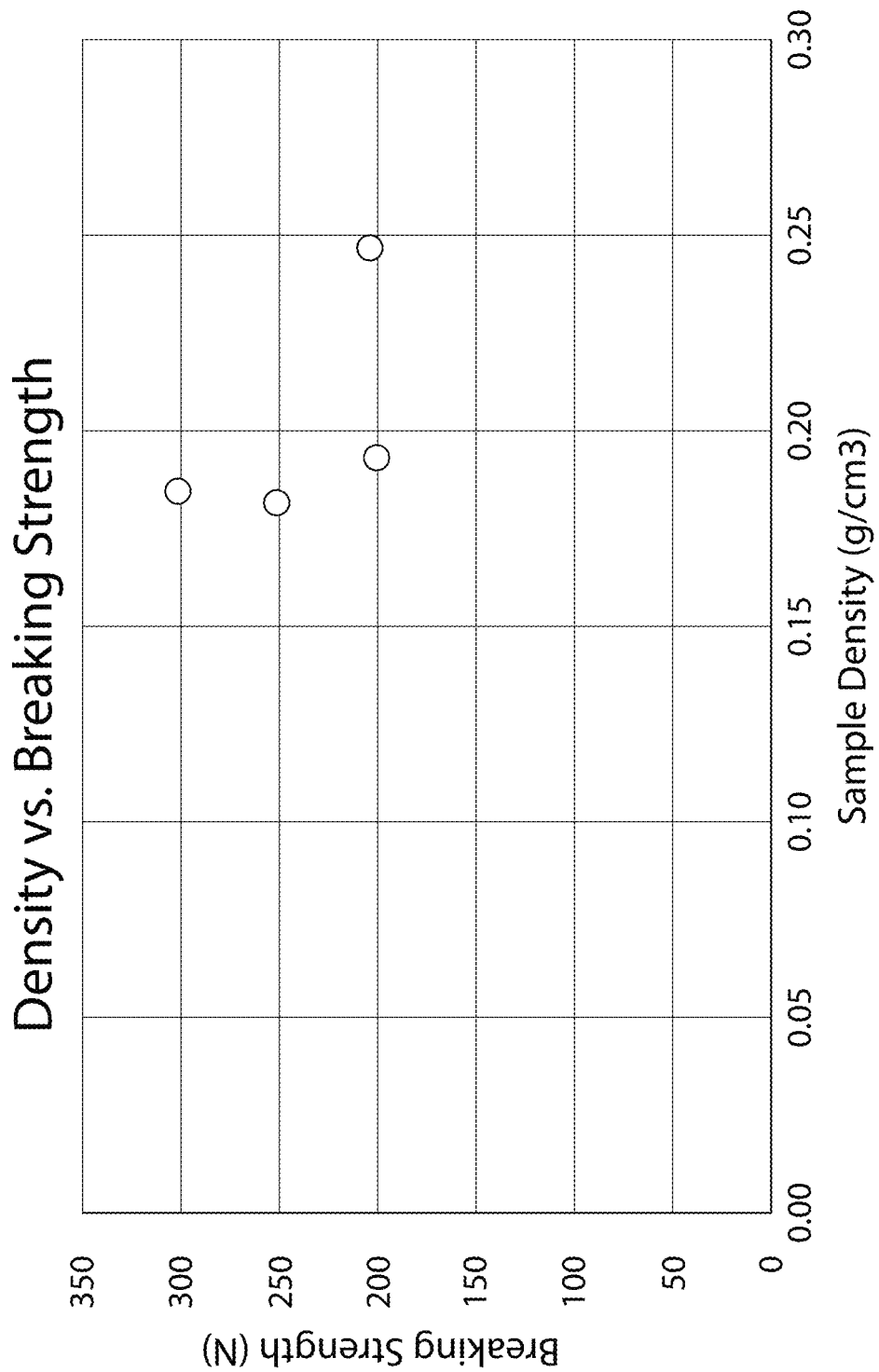
FIG. 3 is a graph showing a relationship between density and breaking strength of examples.

Examples were also subjected to a three-point flexural strength test. Examples of approximately 22 cm in length and 22 to 24 mm in diameter and density between 0.15 and 0.25 g/cm3 were supported at a span of 171.5 mm and downward force was applied with a string of approximately 3 mm in thickness and measured by a force meter. As can be seen in FIGS. 2 and 3, the examples demonstrated breaking strength between 200N and 300N.

Figure 4:
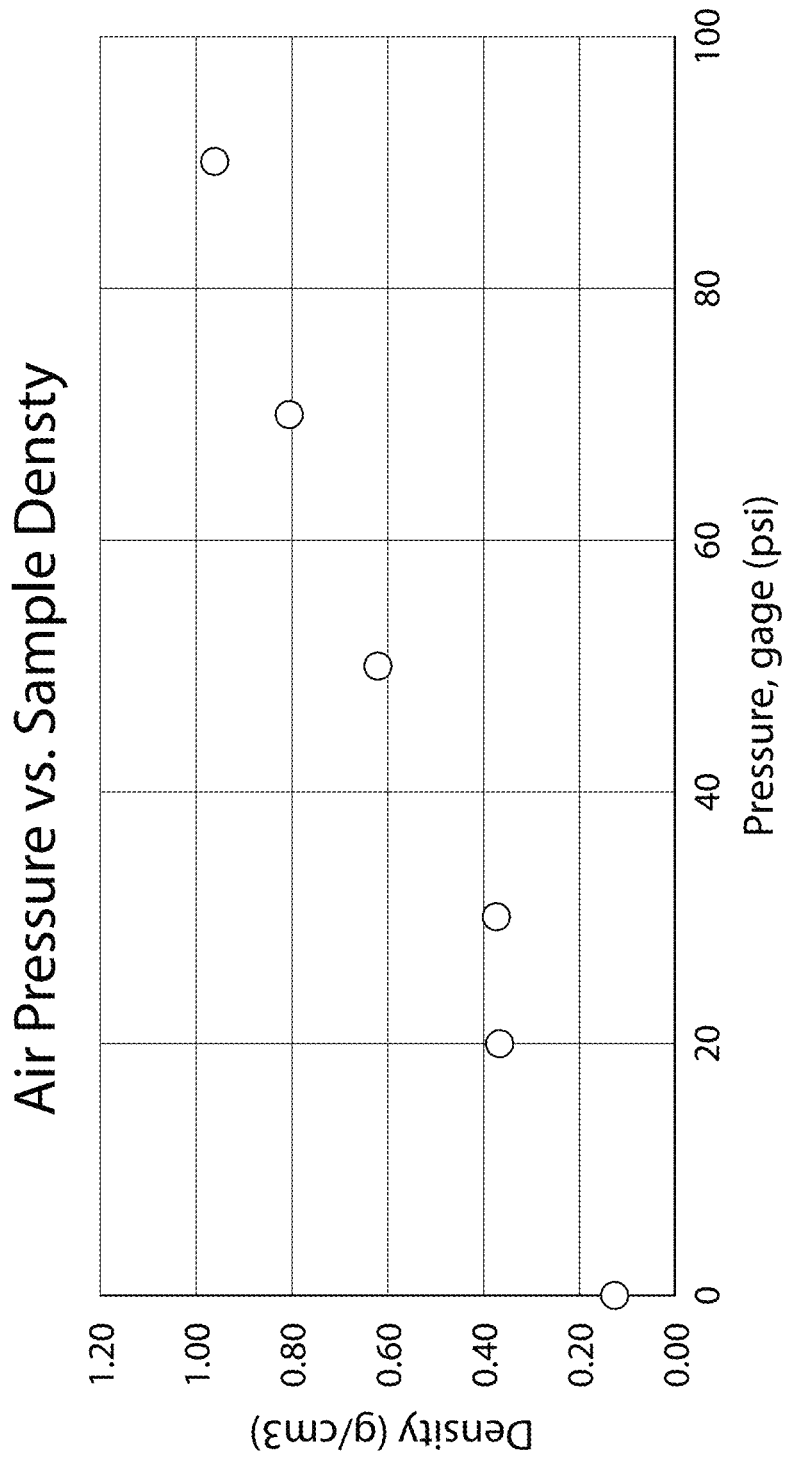
FIG. 4 is a graph showing results of foam expansion under air pressure for examples.

In order to test the ability of HF402 to expand under pressure, an air pressure chamber was used. The resins were mixed by hand for 10 s and poured into a cup inside the chamber. The chamber was then quickly sealed and pressurized with air to the chosen pressure before the reaction of the foam began. It was then held at this pressure for at least 5 minutes, at which point the pressure was released and the example removed from the chamber. The test was performed at pressures of 20, 30, 50, 70, and 90 psi. It was confirmed that the foam was able to react at all these pressures. The expansive ability and density of the examples is shown in the graph of FIG. 4 and in Table 2 below. In particular, FIG. 4 shows results of the foam expansion under air pressure. Examples under higher pressure expanded less and were therefore more dense.

TABLE 2

Data from air pressure experiment.

| Pressure (Psi) | Mass (G) Example | Volume (Ml) | Density (G/Ml) | Mass Residue (G) | Volume Residue (Ml) | Residue Density (G/Ml) |
|---|---|---|---|---|---|---|
| 0 | 9.4 | 75 | 0.13 | — | — | — |
| 20 | 12.1 | 33 | 0.37 | 1.5 | 7 | 0.2 |
| 30 | 11.2 | 30 | 0.37 | 1.7 | 10 | 0.2 |
| 50 | 11.2 | 18 | 0.62 | 1.4 | 7 | 0.2 |
| 70 | 12.1 | 15 | 0.81 | 1.3 | 5 | 0.3 |
| 90 | 12.5 | 13 | 0.96 | 1.8 | 6 | 0.3 |

Density of the residual foam left in the cups and cured at 0 gage pressure serves as reference, and variation suggests that the ratios of resin A to B was not equal across all examples. While the property of the HF402 was extensively studied as an example of expandable water activated foam for rigid inflatable structures, the expandable foams (e.g., AV202 Multigrout) are also water activated flexible foam for flexible underwater inflatable structures.

The water/moisture activated expanding foams possess many beneficial properties that make them attractive to develop inflatable structures, especially for underwater use. The water/moisture activated expanding foams may expand multiple times, for example, more than triple times in volume, at least about 7-8 times in volume, 12:1 to 25:1 in volume. For HF402, about 100% of that expansion is converted into rigidity. The water/moisture activated expanding foams can cure rapidly, in general within several minutes (e.g., 3 minutes, 5 minutes, 10 minutes, 15 minutes). The HF402 foams have been demonstrated to be very strong, deform minimally under bending stress and to be very resistant to high pressure environments once cured.

Figure 5:
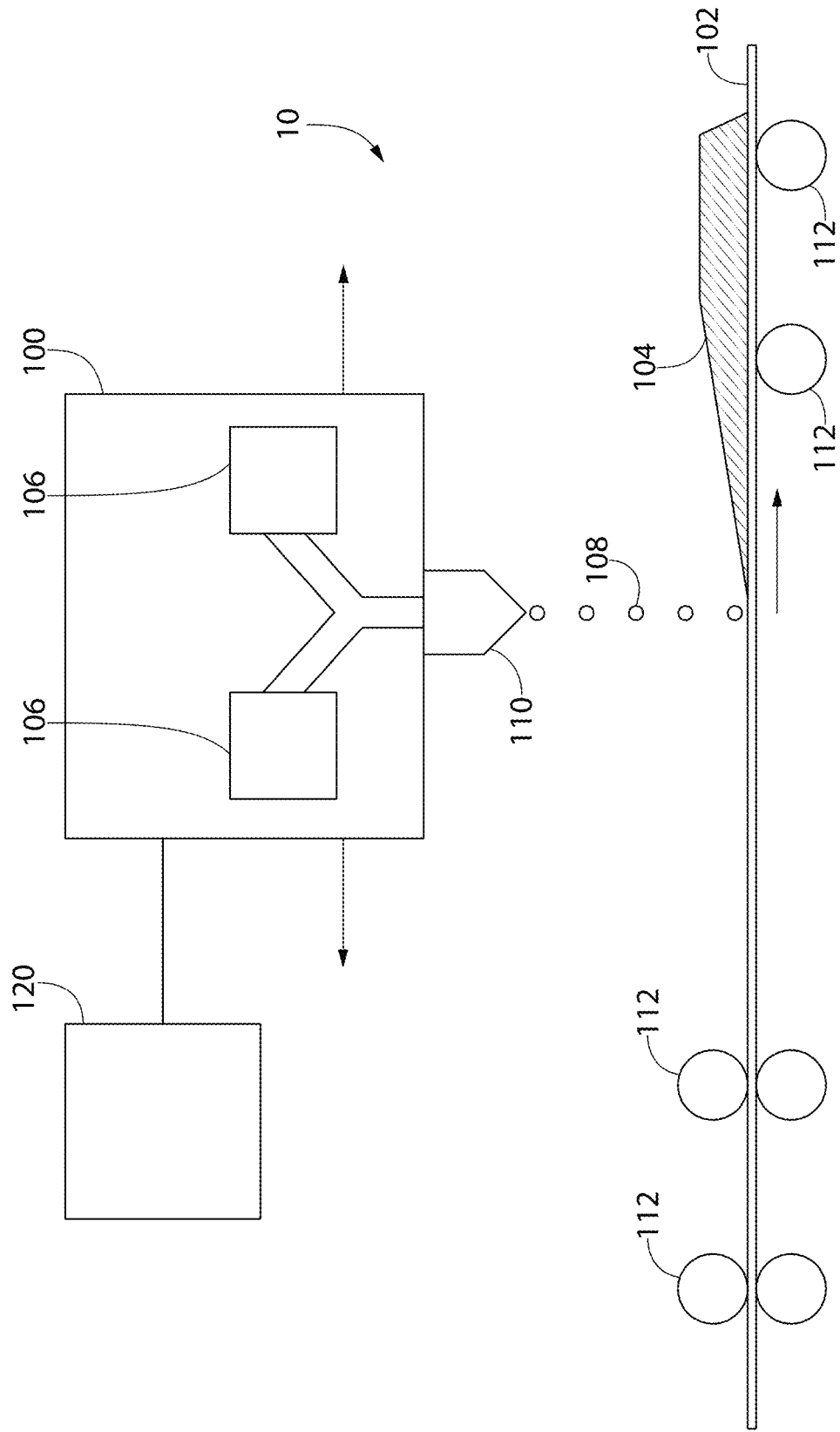
FIG. 5 is a side view, partially in section, of 3D printing system for forming an expandable foam structure useable as an UDS with 3D printing according to examples.
Figure 6:
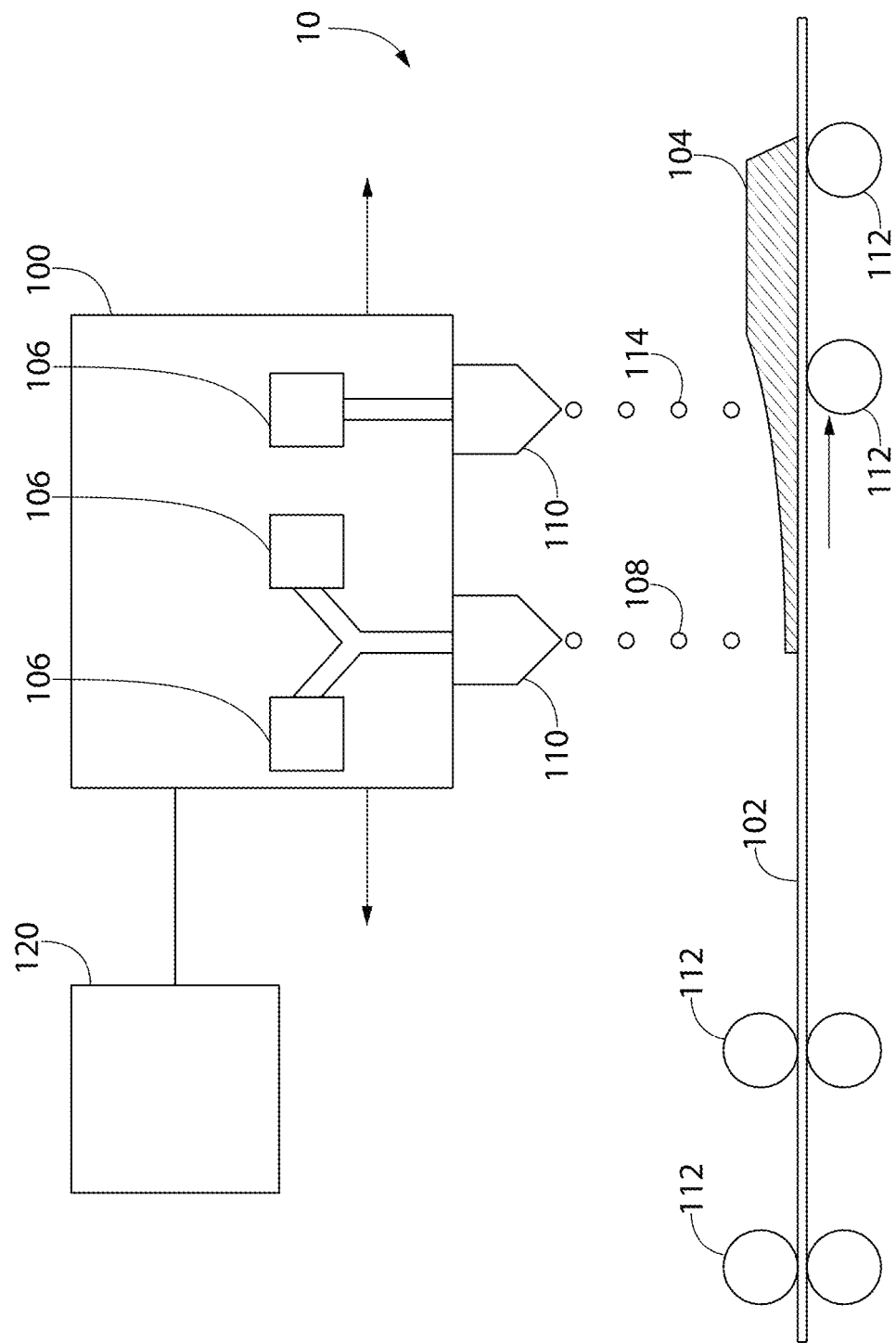
FIG. 6 is a side view, partially in section, of another 3D printing system for forming an expandable foam structure useable as an UDS with 3D printing according to examples.

FIGS. 5 and 6 depict 3D printing systems 10 for forming an expandable foam structure useable as an UDS with 3D printing. In the systems 10 an exemplary 3D printer 100 may be a type of ink-jet printer that deposits expandable foam onto a substrate 102, which may be fixed or moveable. In illustrative implementations, a three-dimensional (3D) expandable foam object may be printed in accordance with a computer 3D model of the object, created by a computer-aided design (CAD) program. For example, the CAD program may be a free-form non-uniform rational basis spline (NURBS) program, or the CAD program may be Solid Works®. In examples, the 3D printer 100 selectively deposits marking material 104 in a physical pattern on a substrate 102 or mold thereof that corresponds to a 3D object as defined by the printer and/or substrate. For each 3D object, expandable foam (e.g., hydrofoam) is attached in a pattern that correspond to the desired structure as an UDS, and expandable foam is not attached to the substrate in positions where the 3D object does not exist. Where layers of the expandable foam are desired for building the 3D object, foam slices of a 3D CAD model may be created, for example, by starting with a 3D model in STL file format and using the Slice Commander feature of Netfabb® Studio software (available from Netfabb GmbH, Parsberg, Germany) to create the foam slices. The selective layered deposition of the expandable foam may be repeated for as many additional layers as required for making the specified 3D object, with each layer normally representing a part or slice of the 3D object.

The 3D printer 100 may include chambers 106 that may house resins of the expandable foam, or resins and catalyst, or single-part resins hereinafter also referred to as combined resin. The combined resin may be water activated to form expandable foam. This water activation may occur upon access of the combined resin to the moisture in the air, or underwater, or to a small amount of fluid (e.g., water) that may be housed in one of the chamber 106 of the 3D printer.

The 3D printer 100 selectively deposits the foam in image-wise fashion at precise locations onto the substrate material 102. The pattern of expandable foam 108 may be deposited via a variety of approaches. For example, the printer may include a thermal inkjet head or a piezoelectric inkjet head as a nozzle to dispense the expandable fluid foam 108. In examples, the printer 100 may apply air pressure via a nozzle (e.g., spray nozzle, inkjet head, valve, opening) to dispense the expandable fluid foam. The printer 100 may also include a solenoid valve if air pressure is used to control the release of air or dispensing of fluid via the nozzle.

In some cases, the expandable foam 108 that is selectively deposited may include water or an aqueous solution that activates the expansion of the foam. Otherwise, the environment of the printer 100 and substrate 102 includes adequate moisture to activate foam expansion.

As can be seen in FIG. 5, the printer 100 may deposit the combined resin/expandable foam 108 via one or more nozzles 110 onto substrate 102. The substrate may be stationary or movable, for example along direction A via rollers 112 that may rotate to move the substrate. The printer 100 may also be movable in relation to the substrate 102 to selectively deposit the expandable foam at different locations of the substrate. After deposition, the foam 108 is free to expand to its expanded size and shape, which may be limited by the substrate 102 where the substrate includes a mold, inflatable structure shell or other structure (e.g., robotic arm cavity, UDS).

FIG. 6 depicts the printer 100 having a plurality of nozzles 110 for depositing components of the expandable foam onto substrate 102. In this example, each nozzle may deposit a different resin 108 or fluid 114 onto the substrate 102, such that the resins may combine after deposition on the substrate into the expandable foam. Upon such a combination, the expandable foam may then expand to its desired expanded size and shape.

The 3D printer 100 is designed to mix the foam resins as needed for moisture activation into an expanded foam. While not being limited to a particular theory, the 3D printer 100 deposits the expandable foam onto the substrate 102 before full expansion. This provides the benefit of creating expanded foam structures on the fly with the 3D printer. The structures can be used as or with UDSs and deployed in an aqueous environment (e.g., under water, body of water, ocean, sea).

As discussed herein, the expandable foam may be deposited into a mold. In example where the substrate is not a mold, or is a mold too large to define the shape of the expanded foam, the shape of the foam may be determined by the speed of deposition, resin mixture ratio, and movement of the spray nozzle 110. As an example, when making a container with the expanding foam, the 3D printer 100 may spray a foam base and then move the nozzle around the periphery of the base to deposit the expandable foam as side walls of the container. In view of the foam expansion, the expanded foam object may not have the resolution of a typical digital 3D printed object. However the expanded foam object provides benefits of sturdy structure that can be prepared on site instead of having to ship the expanded object to the site for deployment.

The process carried out by the 3D printing systems 10 may be sequenced and monitored using one or more controllers 120. The controller 120 may read and execute build instructions generated by an outboard computer (not depicted) based on a 3D model of the expandable foam object that is to be printed. For example, the printer 100, substrate 102, and rollers 112 may operate as discussed herein based on input from the controllers. Thus while the controller 120 is shown in communication with 3D printers 100, it is understood that the controller may be in communication with any component of the 3D printing system.

Figure 7:
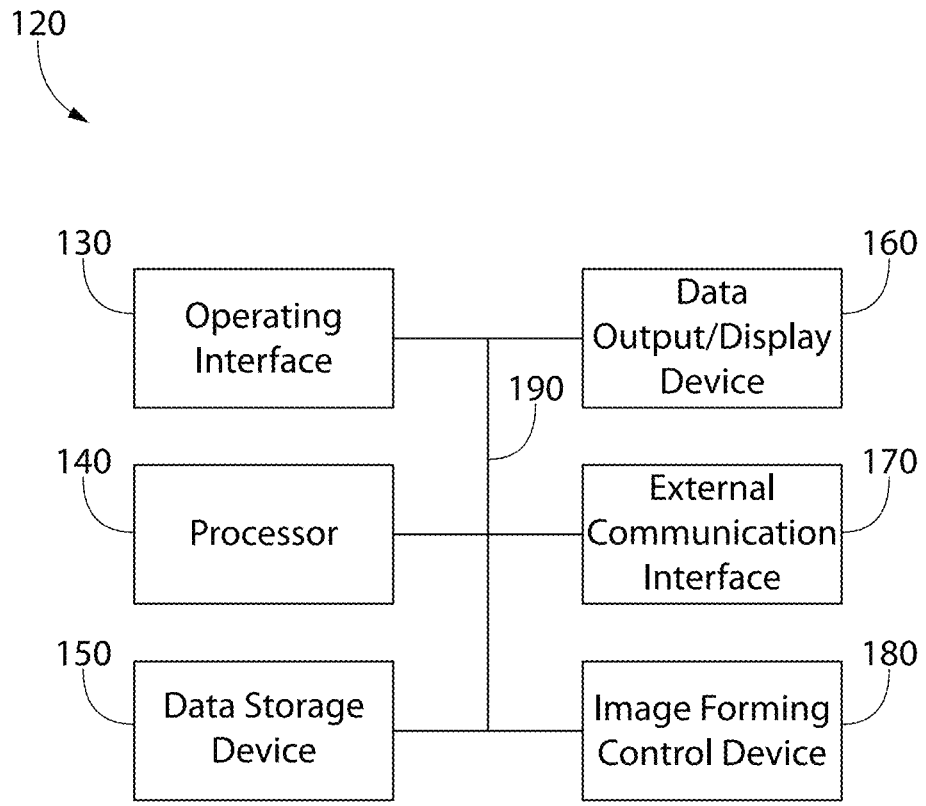
FIG. 7 illustrates a block diagram of an exemplary control system for implementing an expanded foam object making scheme for underwater deployable structures according to examples.

FIG. 7 illustrates a block diagram of the controller 120 for executing instructions to automatically control exemplary devices in the 3D printing systems 10 illustrated in FIGS. 5 and 6. The exemplary controller 120 may provide input, to or be a component of a controller for executing the expandable foam object forming process in a system such as that depicted in FIGS. 5-6 and described in greater detail below in FIG. 8.

The exemplary controller 120 may include an operating interface 130 by which a user may communicate with the exemplary controller 120. The operating interface 130 may be a locally-accessible user interface associated with the 3D expandable foam printing system 10. The operating interface 130 may be configured as one or more conventional mechanism common to control devices and/or computing devices that may permit a user to input information to the exemplary controller 120. The operating interface 130 may include, for example, a conventional keyboard, a touch-screen with "soft" buttons or with various components for use with a compatible stylus, a microphone by which a user may provide oral commands to the exemplary controller 120 to be "translated" by a voice recognition program, or other like device by which a user may communicate specific operating instructions to the exemplary controller 120. The operating interface 130 may be a part or a function of a graphical user interface (GUI) mounted on, integral to, or associated with, the 3D expandable foam printing system 10 with which the exemplary controller 120 is associated.

The exemplary controller 120 may include one or more local processors 140 for individually operating the exemplary controller 120 and for carrying into effect control and operating functions for expandable foam object forming, including implementing expandable foam patterning and layer forming schemes with which the exemplary controller 120 may be associated. Processor(s) 140 may include a conventional processor or microprocessor that interpret and execute instructions to direct specific functioning of the exemplary controller 120, and control of the expandable foam object forming process with the exemplary controller 120.

The exemplary controller 120 may include one or more data storage devices 150. Such data storage device(s) 150 may be used to store data or operating programs to be used by the exemplary controller 120, and specifically the processor(s) 140. Data storage device(s) 150 may be used to store information regarding, for example, one or more 3D object models for producing expandable foam structures in the 3D printing system 1 with which the exemplary controller 120 is associated. Stored 3D object model information may be devolved into data for the printing of a series of layers of foam slices for forming the expanded foam object in the manner generally described by example herein.

The data storage device(s) 150 may include a random access memory (RAM) or another type of dynamic storage device that is capable of storing updatable database information, and for separately storing instructions for execution of 3D printing system operations by, for example, processor(s) 140. Data storage device(s) 150 may also include a read-only memory (ROM), which may include a conventional ROM device or another type of static storage device that stores static information and instructions for processor(s) 140. Further, the data storage device(s) 150 may be integral to the exemplary controller 120, or may be provided external to, and in wired or wireless communication with, the exemplary controller 120, including as cloud-based data storage components.

The exemplary controller 120 may include a data output/display device 160, which may be configured as one or more conventional mechanism that output information to a user, including, but not limited to, a display screen on a GUI of the 3D expandable foam printing system 10 with which the exemplary controller 120 may be associated. The data output/display device 160 may be used to indicate to a user a status of an expandable foam structure forming operation effected by the 3D expandable foam printing system with which the exemplary controller 120 may be associated including an operation of one or more individually controlled components at one or more of a plurality of separate processing stations or subsystems in the systems.

The exemplary controller 120 may include one or more separate external communication interfaces 170 by which the exemplary controller 120 may communicate with components that may be external to the exemplary controller such as the 3D expandable foam printing system 10. One of the external communication interfaces 170 may be configured as an input port to support connecting an external CAD/CAM device storing modeling information for execution of the control functions in the expandable foam structure object forming operations. Any suitable data connection to provide wired or wireless communication between the exemplary controller 120 and external and/or associated components is contemplated to be encompassed by the depicted external communication interface 170.

The exemplary controller 120 may include an image forming control device 180 that may be used to control the 3D printing process on the substrate 102 which produces the expandable foam object or layers of the expandable foam object according to devolved 3D object modeling information. The substrate 102 may be fed through the 3D printing system 10 to have marking material formed thereon under the control of the image forming control device 180. The substrate may exit the 3D printing system as foam printed substrate for forming or supporting an UDS. The image forming control device 180 may operate as a part or a function of the processor 140 coupled to one or more of the data storage devices 150, or may operate as a separate stand-alone component module or circuit in the exemplary controller 120. Either of the processor 140 or the image forming control device 180 may parse the input 3D object model information to determine and execute a layer-by-layer foam layer printing scheme on the substrate material 102.

All of the various components of the exemplary controller 120, as depicted in FIG. 7, may be connected internally, and to one or more 3D printer 100 and/or components thereof, by one or more data/control busses 190. These data/control busses 190 may provide wired or wireless communication between the various components of the exemplary controller 120, whether all of those components are housed integrally in, or are otherwise external and connected to a 3D printing system 10 with which the exemplary controller 120 may be associated.

It should be appreciated that, although depicted in FIG. 7 as an integral unit, the various disclosed elements of the exemplary controller 120 may be arranged in any combination of sub-systems as individual components or combinations of components, integral to a single unit, or external to, and in wired or wireless communication with the single unit of the exemplary controller. In other words, no specific configuration as an integral unit or as a support unit is to be implied by the depiction in FIG. 7. Further, although depicted as individual units for ease of understanding of the details provided in this disclosure regarding the exemplary controller 120, it should be understood that the described functions of any of the individually-depicted components, and particularly each of the depicted control devices, may be undertaken, for example, by one or more processors 140 connected to, and in communication with, one or more data storage device(s) 150.

Figure 8:
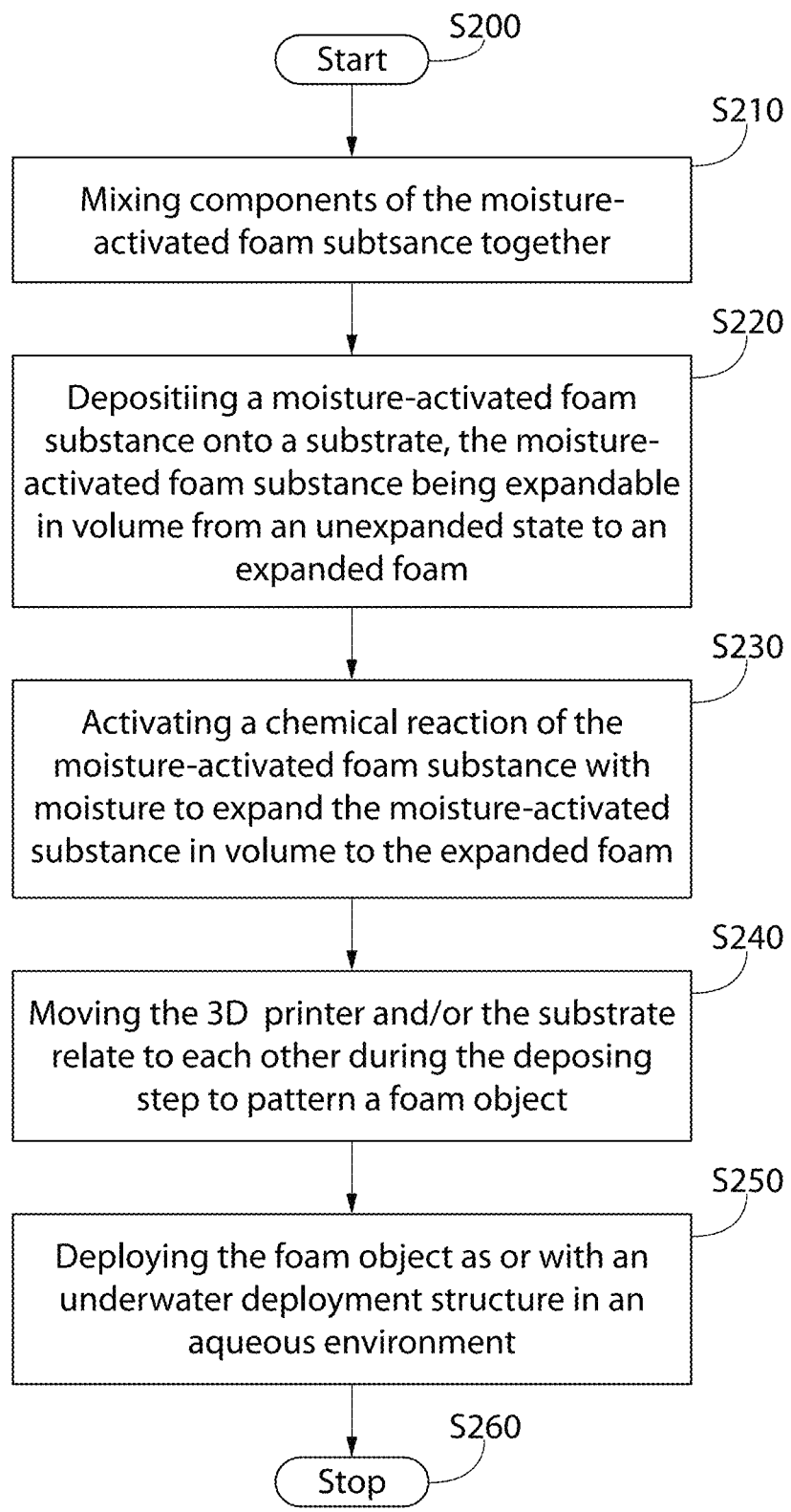
FIG. 8 is a flowchart depicting the operation of an exemplary method of making a foam object for an underwater deployable structure.

The disclosed embodiments may include an exemplary method for expandable foam structure processing with 3D printer 100. FIG. 8 illustrates a flowchart of such an exemplary expandable foam structure processing method during composite based additive manufacturing, which commences at Step S200 and proceeds to Step S210.

At Step S210, components of the moisture activated expandable foam 108 are mixed together for activation of the foam. The components may be mixed by a mixer, blender or by combining the components from different containers into a single chamber to form the moisture activated expandable foam 108 Operation of the method proceeds to Step S220, where the moisture activate expandable foam is deposited onto a substrate. Deposition may be provided by a 3D printer nozzle, a valve or another controllable opening that emits or releases the moisture activated expandable foam onto a substrate. Operation of the method proceeds to Step S230.

At Step S230, a chemical reaction of the moisture-activated foam substance is activated with moisture to expand the moisture-activated substance in volume to the expanded foam. The expansion may be defined by the size/shape of the substrate, speed of deposition, resin mixture ratio, and movement of the foam depositing nozzle.

Operation of the method shown in FIG. 8 proceeds to Step S240, where if a 3D printer is depositing the expandable foam, then the 3D printer and/or the substrate may be moved relative to each other during the deposing step S220 to pattern an expanded foam object. Operation of the method proceeds to Step S250, where the expanded foam object or structure may be deployed as or with an UDS in an aqueous environment. Operation of the method ends at step S260.

The exemplary depicted sequence of executable method steps represents one example of a corresponding sequence of acts for implementing the functions described in the steps. The exemplary depicted steps may be executed in any reasonable order to carry into effect the objectives of the disclosed examples. No particular order to the disclosed steps of the method is necessarily implied by the depiction in FIG. 8, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

The water/moisture activated expanding foams have demonstrated the ability to react and cure under pressure, although this may reduce the expansion ability of the material. The foam was also able to be activated with static mixers deployed from a conventionally available double-barrel syringe. Longer mixers may further improve the expansive ability and expanded foam quality. The foam is relatively easy to contain since a foam-tight structure is easier to achieve than water-tight or air-tight structures.

A deployment mechanism could be made to activate a UDS with the water/moisture activated expanding foams. With the use of devices such as static mixers, plungers, and pressure-sensitive components, the entire deployment system may be mechanically-activated, with minimum or no need for electricity.

The expanding foams may be applied with a UDS as a buoyance engine, where ratios of two types of materials may control the depth of a structure. This may be accomplished without the need of significant power. In examples, unexpanded foam in resin form may be heavier than water while expanded foam may be lighter than water depending on the amount of expansion. Generating (e.g., expanding) the foam may raise the structure and releasing the foam from the structure may lower the structure. The UDS may carry multiple packages of expandable foams to allow the UDS to raise and lower the UDS in water repeatedly as desired.

Figure 9:
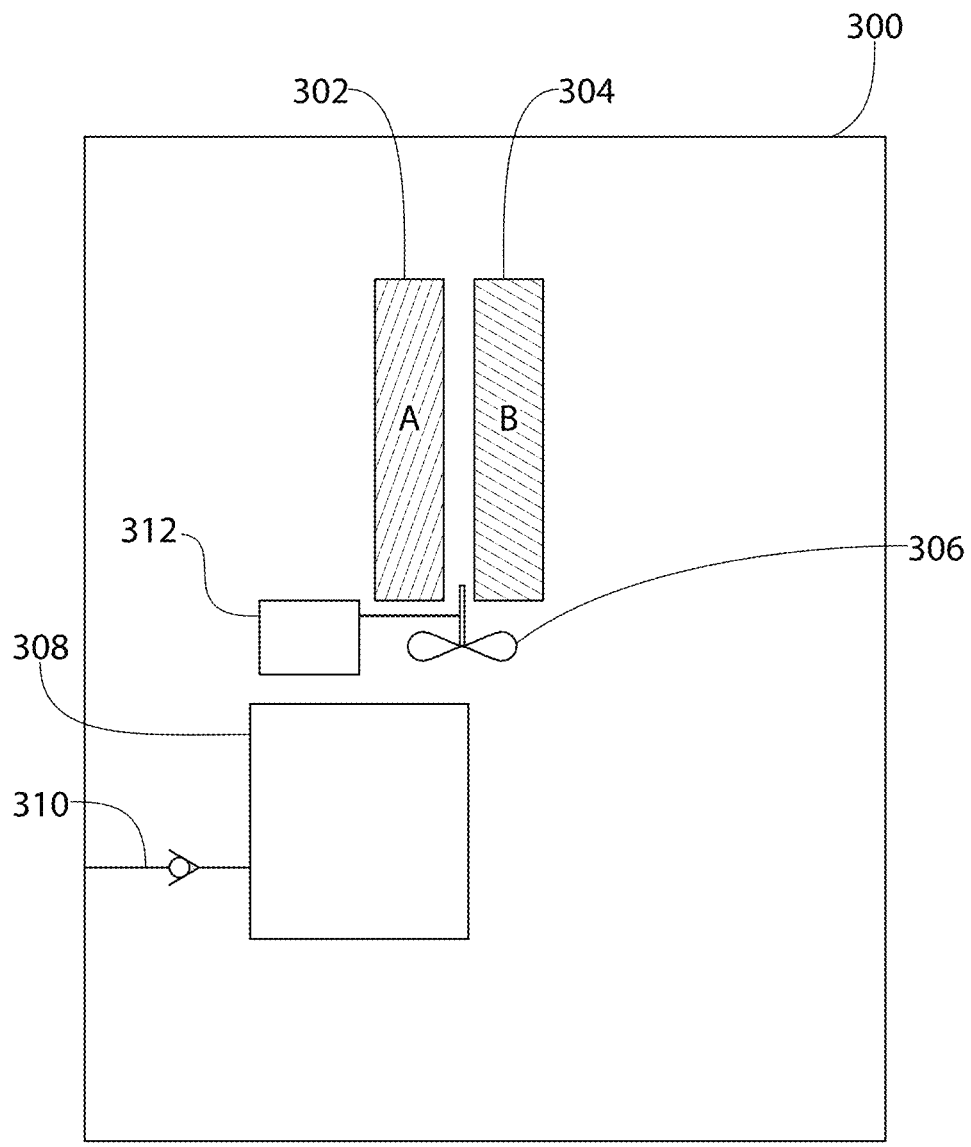
FIG. 9 is a side view of buoyance engine in accordance with examples of embodiments.

FIG. 9 depicts an exemplary buoyance engine 300 housing unexpanded foam in resin form heavier than water housed in two containers 302, 304. The unexpanded foam resin may be mixed, for example via a mixer 306. The mixer may be activated by a small power source 312 (e.g., small battery, thermoelectric generator, thermocouplers) in the buoyance engine 300 as understood by a skilled artisan. The mixed resin may expand within or adjacent the buoyance engine 300 into an expanded foam 308 that is lighter than water to raise the buoyance engine and connected UDS as desired to a shallower level. The expanded foam 308 may be released by a valve 310 (e.g., one-way, check, two way) into the aqueous environment, which may be activated for example by battery power or thermal energy from prior foam expansion via thromoelectric generator or thermocouplers, to lower the buoyance engine and attached structure, as readily understood by a skilled artisan.

Moreover, the expanding foams may be applied with Smart Underwater Self-sustained Expandable Structures (SUSES). For example the expanding foams may be deployed in or adjacent such structures to improve the structure stability of the SUSES. The expanding foams may also be deployed in or adjacent existing SUSES to repair the structures, for example, by expanding into and/or about such structures to provide structural support or fill gaps and strengthen weakened areas of the SUSES. Such deployment may not require external power, at least due to the exothermic chemical reaction of the expanding foams and power derived therefrom. The expanding foams may be combined with other materials, such as hydrogel, to aid in the structural stability. Since the expandable foams may expand several times in volume into countless shapes, packages of the unexpanded foam are easily transportable and can fit different shoreline terrains and bathymetry.

As mentioned above, exemplary embodiments of the water/moisture activated expanding foams, especially the rigid expanding foam such as HF402 may include building the framework for underwater inflatable structure, including structure for sensor mounting. The low energy consumption of power that may be provided by a battery or thermoelectric generator, strong rigidity of the final structure under high pressure makes it an attractive alternative to state-of-the-art UDSs that relying on underwater pump for inflation.

In addition, the energy generated from the chemical reaction (i.e., thermal energy) can be utilized to benefit the UDS, for example, with thermocouplers or thermoelectric generators that generate power from the exothermic chemical reaction and drive anchors into the seabed, drive a mixing device at the foam to improve the uniformity of the foam, or as a propellant to drive the structure to a final destination. Another exemplary UDS installation may include a stowed collapsed package, such as a stowed sensor package, that may be released above a body of water, for example, released from a helicopter or USV. The stowed package may include expandable foam triggered in one or more phases as desired. For example, a stowed sensor package may trigger a portion of the unexpanded foam, which may be packaged separately from other expandable foam packages, to provide initial structural expansion and/or thermal energy usable as a propellant to drive the package to a desired destination. In a subsequent phase, another portion of the unexpanded foam maybe triggered to expand and generate a foam anchor or otherwise drive the structure into a seabed.

The amorphous expandability of the foam permits use in countless shaped structures faster than conventional methods of printing, and with greater durability. For example, an expanding foam based raft is more durable than an air-based raft that may fail upon air leakage through an outer skin of the raft. Once expanded, the foam adds structural integrity to the raft that is maintainable even with tears through an outer skin. Further, the flexibility of realizing different structures with the water/moisture activated expanding foams can be advantageous for the installation of sensors such as electro-optical sensors (imagers) and lights, or magnetometer sensors.

Another important application of the water/moisture activated expanding foams is integration into robotic manipulators for underwater applications. There are several benefits realized by robotic manipulators having expanding foams as described herein. Currently many robotic manipulators are built using 3-D printing parts to create the structures for cost reduction. Benefits of the water/moisture activated expanding foams here is that the curing time is significantly shortened. Another related advantage due to the shortened curing time is that the final shape can be altered on the fly to adapt to the mission and environment.

Different types of expanding foams can be utilized to realize different functions in the robotic manipulator. For example, rigid expanding foams such as HF402 may expand into skeletal or bone like functions of the manipulator. Further, flexible expanding foams such as AV202 Multigrout may expand into tendon or muscle like functions between adjacent structural components of the manipulator. These foams may also be integrated with robotic manipulators to improve their functionality, including improving the functioning of robotic vision, for example, expanding foam as desired to improve focus, alignment and buoyancy for compact underwater platforms operating in challenging environments.

Figure 10:
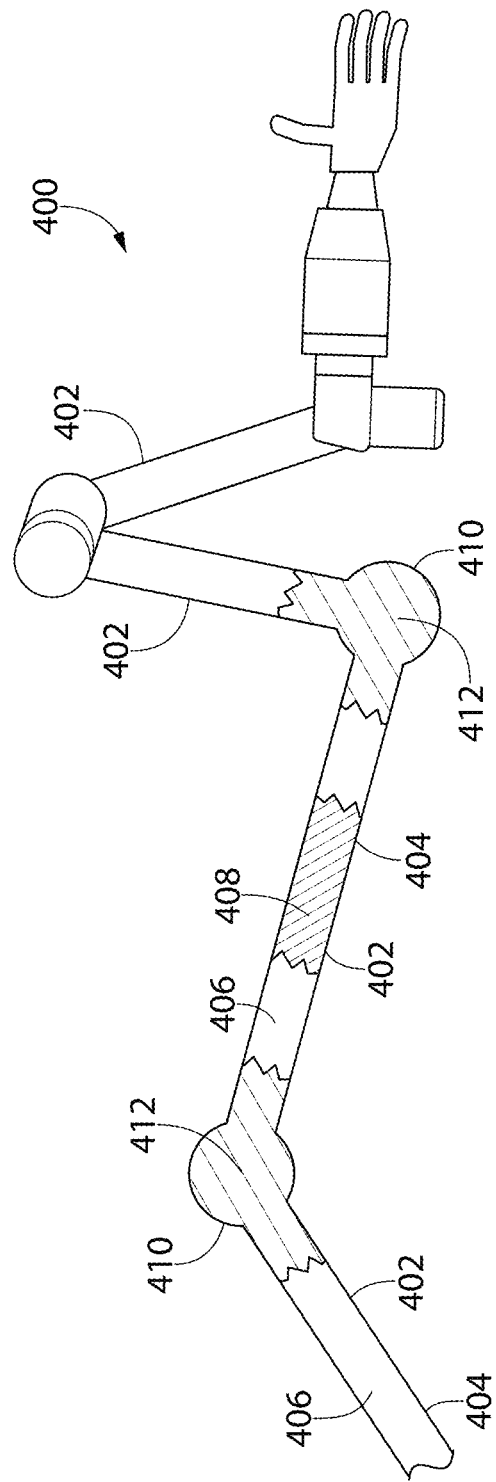
FIG. 10 is a side view of a robotic arm shown as an exemplary UDS in accordance with examples of embodiments.

FIG. 10 illustrates a robotic arm 400 partially in cross section. The robotic arm 400 shown is an exemplary UDS, having a plurality of beams 402 coupled together. The beams 402 may be mechanically expandable underwater from an unexpanded configuration to an expanded configuration. The beams 402 have an outer wall 404 with hallowed sections therein defining cavity wells 406. The beams 402 may be an exemplary substrate, with rigid expanded foam 408 in cavity wells 406 to structurally support the beams as an internal bone of the respective beam. At a coupling 410 of the beams 402, flexible expanded foam 412 is deposited and extends into the cavity wells of the adjacent beams to elastically support the attachment of the respective beams as a flexible joint. Once the tasks are completed, potentially the foams may be intentionally stripped or dissolved either using dissolver chemical agents or other approaches to reduce the stowed dimension while allowing other high-valued manipulator components to be retained and reused.

Figure 11:
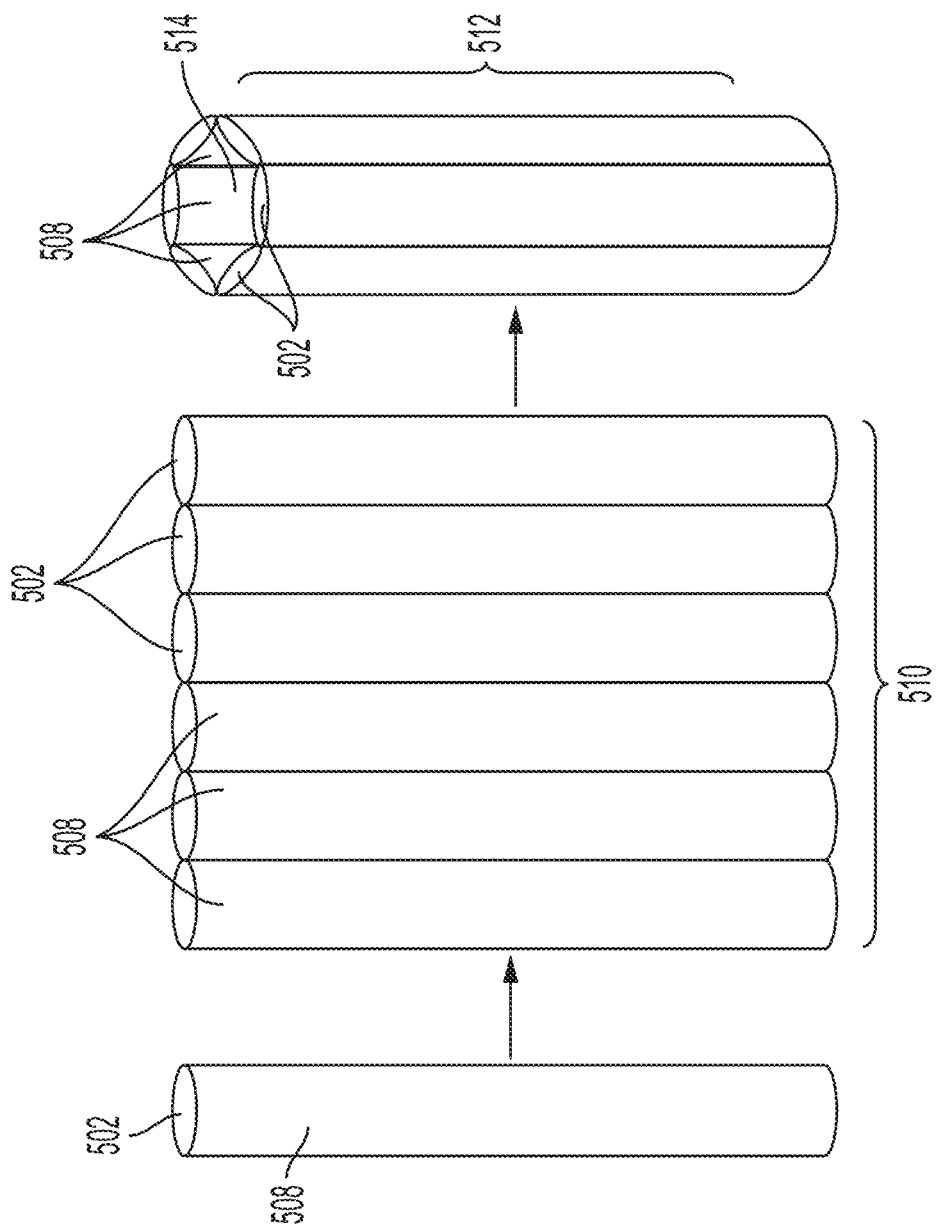
FIG. 11 illustrates a diagram of a perspective view of exemplary arrangements of a permeable sleeve.
Figure 12B:
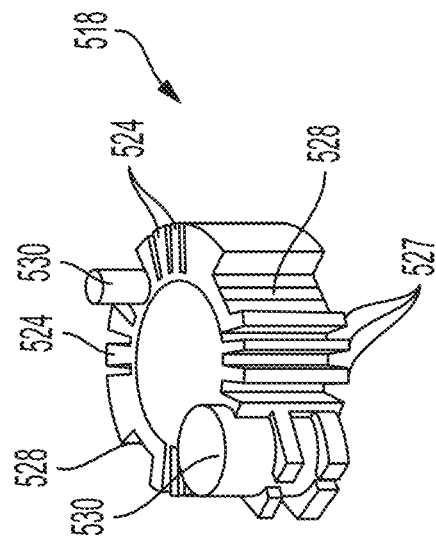
FIG. 12B is an isometric view of the exemplary sensor holder of FIG. 12A.
Figure 12D:
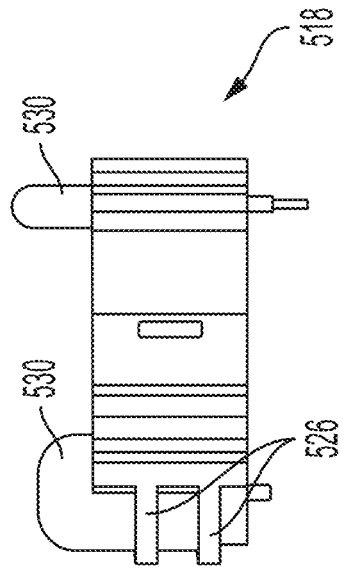
FIG. 12D is a right side view of the exemplary sensor holder of FIG. 12A.
Figure 12A:
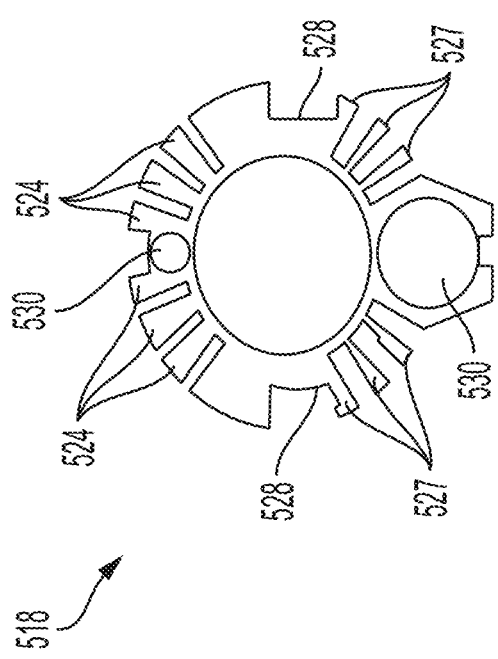
FIG. 12A is a top view of an exemplary sensor holder.
Figure 12C:
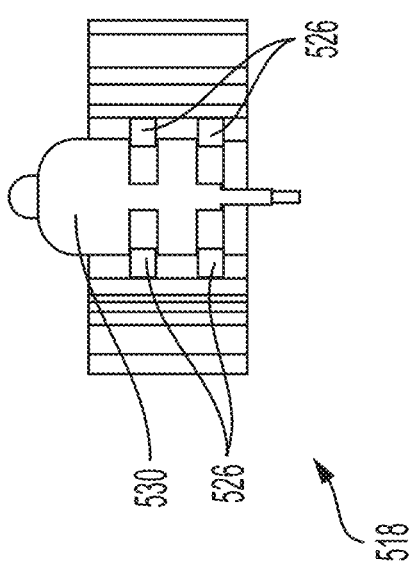
FIG. 12C is a front view of the exemplary sensor holder of FIG. 12A.

UDSs may also be deployed via physical-based expansion (PBE) with an array using recoverable water swelling material 502 which comes into contact with the surrounding water. This approach uses a dual layer tubular structure 500 (FIG. 19B), wherein the tubular structure 500 includes an outer layer 504 (FIGS. 19A-19C) and an inner layer 506 (FIG. 16A), wherein the inner layer 506 includes a permeable sleeve 508 (FIG. 11) to permit the water swelling material 502 to come into contact with water. The outer layer 504 includes hallowed sections therein that may at least partially define cavity wells. In other words, cavity wells may be defined by inner and outer layers of a permeable sleeve. The permeable sleeve 508 may be made of nylon material. FIG. 11 depicts example arrangements of the permeable sleeve 508. The permeable sleeve 508 may include a single permeable sleeve, or multiple permeable sleeves. Further, UDS examples with multiple permeable sleeves 508 may arrange the nylon sleeves into a panel formation 510, wherein each permeable sleeve 508 is arranged adjacent to another, or into a hollow pipe formation 512, wherein each permeable sleeve 508 is arranged adjacent to another and wrapped in a circular formation with a hollow center area 514.

In examples the term array may refer to a structural framework or arrangement that supports a UDS, and may include the UDS. The array may further include but is not limited to a support skeleton, tubular structure, support beams, tubular beams, molds, containers, rafts, robotic manipulators, buoyance engines, Self-sustained Expandable Structures, framework for underwater inflatable structures and components thereof as discussed herein and known to a skilled artisan. Some components may include sensors, sensor mounting structure, sensor holders, walls or sleeves having outer/inner layers, cavity wells, water swelling material, moisture-activated substance, pumps, valves, substrates and connectors including ropes. In certain examples, the array's buoyancy may be adjustable through approaches including but not limited to adjusting inflation through a mechanical pump, releasing water from the array via an opening (e.g., aperture, permeable substrate, pressure relief valve), controlling exposure of moisture activated substance and water swelling material to water, or dehydrating water swelling material.

The permeable sleeve 508 may be filled with moisture activated substance including water swelling material 502 (FIG. 11), for example, hygroscopic gel (hydrogel). Hydrogels are superabsorbent polymers with capabilities of growing many times (e.g., more than 50, more than 100, more than about 250) their initial volume when placed in water, making them of particular interest in the physical-based expansion method. Furthermore, hydrogels can shrink back to their original volume once taken out of water through dehydration, permitting the water swelling material 502 to be reusable when employed in a UDS. The use of water swelling material 502 permits long-lasting stiffness of the tubular structure 500 post-expansion, provides a method of expansion that expends zero energy, and does not require additional steps, such as mixing. Further, as the water swelling material's 502 size is significantly decreased when dehydrated, the pre-expansion storage volume of UDSs employing water swelling material 502 is minimal.

Figure 14A:
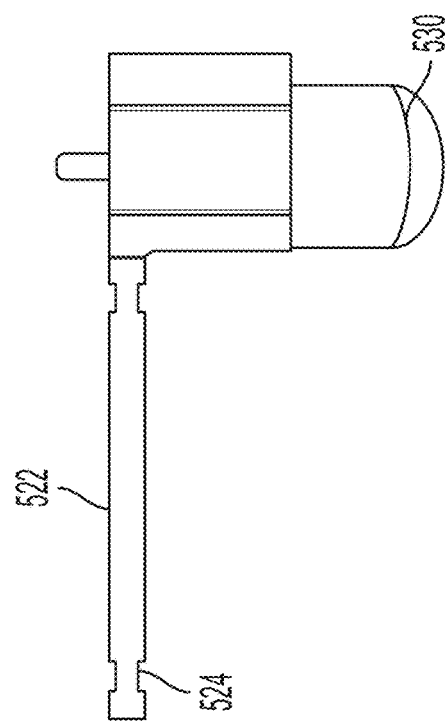
FIG. 14A is a top plane view of an exemplary sensor holder.
Figure 14B:
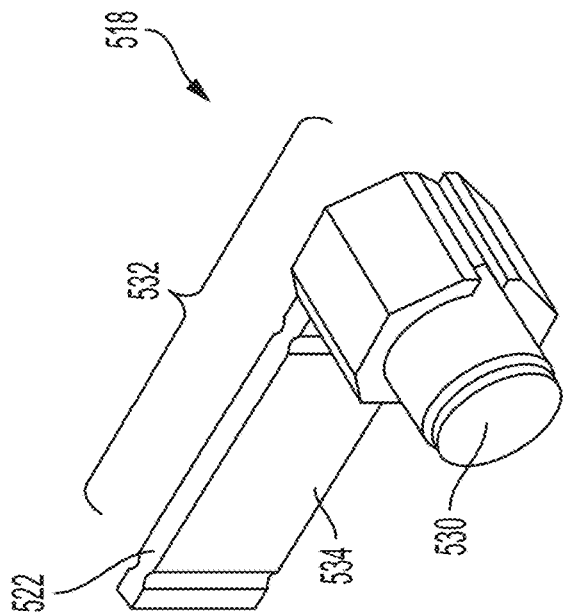
FIG. 14B is an isometric view of the exemplary sensor holder of FIG. 14A.
Figure 14C:
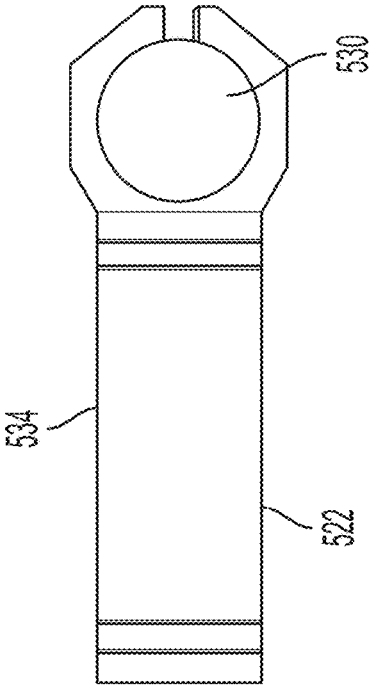
FIG. 14C is a front view of the exemplary sensor holder of FIG. 14A.
Figure 14D:
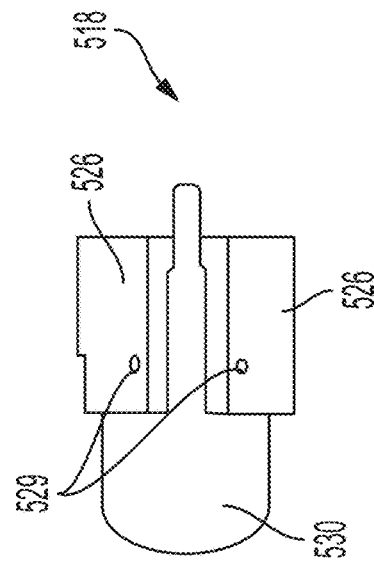
FIG. 14D is a right side view of the exemplary sensor holder of FIG. 14A.

The outer layer 504 of the tubular structure 500 maintains the structural form of the UDS and serves as a surface to which sensor holders may be coupled. FIGS. 12A-D depict an assembly of the sensor holders 518. In certain examples, the sensor holders 518 have a circular configuration 542 (FIGS. 19D and 19E). The sensor holders 518 may hold a single sensor or multiple sensors, which may include but are not limited to acoustic sensors, temperature sensors, salinity sensors, and/or dissolved oxygen sensors. In further examples, the sensor holders 518 are compact and possess a quadrant-circular geometry. FIGS. 13A-C depict an assembly of sensor holders 518 with quadrant circular geometry 520. The sensor holders 518 may include notches 524 on the edge of the holder used as a location to deposit adhesive. The sensor holders 518 may further include grips 526 to further secure the sensors to the sensor holder 518. In certain examples, the sensor holders 518 may additionally include grooves 528, wherein the grooves 528 serve as guides to align cables that may run the length of the UDS to the sensor 530. In additional examples, the sensor holder 518 may have a horizontal configuration 522 (FIG. 14A). For UDSs having multiple permeable sleeves 508 arranged in a pipe formation 512 (FIG. 11), FIGS. 14A-D show an exemplary sensor holder 518 assembly including an L-shaped node 532; a horizontal configuration 522 sensor holder 518; an extruded rectangular dowel 534; multiple notches 524, and grips 526.

The notches 524 are designed as a deposit location for adhesives to adhere and secure the sensor holder 518 to the tubular structure 500. For example, the notches may hold glue or can serve as a place to hold a zip tie to secure the sensor holder 518 to the tubular structure 500 (FIG. 19B). The grips 526 may hold the sensor 530 in place.

While expansion via mechanical or chemical approaches may be completed within minutes, expansion with water swelling materials 502 can take much longer (e.g., up to several hours). As the tubular structure's 500 (FIG. 19B) inner layer 506 (FIG. 16A) is highly flexible before the water swelling material fully expands, it is possible the inner layer 506, on its own and without structural support, could get tangled within itself or with debris by the time the water swelling material reaches peak expansion and adds rigidity to the tubular structure 500. As a result, the tubular structure's 500 outer layer 504 (FIG. 16B) aids in preventing the inner layer 506 including the permeable sleeve 508 (FIG. 16A) from becoming tangled within itself and with materials or wildlife in the ocean. The outer layer 504 has more rigidity than the inner layer 506 and maintains the form of the tubular structure 500 while the water swelling material is expanding. Further, while the tubular structure 500 enables a single, larger diameter permeable sleeve 508 to be used, the inventors discovered that the use of multiple permeable sleeves 508 with smaller diameters required less time for each permeable sleeve 508 to achieve the desired level of expansion and rigidity in situations where faster expansion is necessary. In examples using multiple permeable sleeves 508 with smaller diameters, the hydrogels can expand within the nylon to the desired stiffness relatively quickly (e.g., about one hour).

In examples the permeable sleeve 508 may be filled with a water-soluble substrate (e.g., water soluble film layer, water-soluble paper 536) in addition to hydrogel beads to store the hydrogel beads and ensure even distribution throughout the permeable sleeve 508 during the expansion process. The use of water-soluble paper 536 (FIG. 15A) holds the hydrogel beads in their pre-expansion positions to ensure uniform infilling without hindering the hydrogel expansion process. Hydrogel beads may be evenly dispersed amongst the water-soluble paper 536 within the permeable sleeve 508 prior to expansion. As water contacts both the hydrogel beads and the water-soluble paper 536, the water-soluble paper 536 dissolves at a rate approximately equal to the speed in which the hydrogel beads expand, allowing the hydrogel beads to expand in a set location within the permeable sleeve 508. This avoids hydrogel beads moving within the permeable sleeve 508 prior to full expansion and unevenly disturbing within the permeable sleeve 508, which could lead to potential irregularities in the tubular structure 500's shape and decreased buoyancy. It is understood that the water-soluable paper 536 is a water-soluable substrate, film or layer, and is not limited to any particular type of water-soluable substrate, film or material layer, as readily understood by a skilled artisan.

Figure 15A:
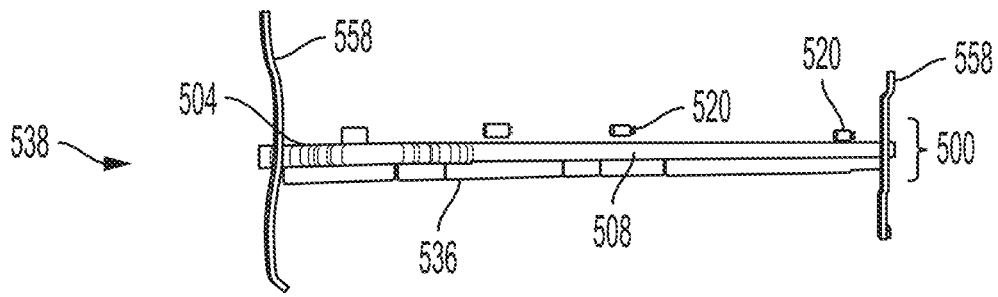
FIG. 15A shows a side view of an exemplary tubular structure of an underwater deployable structure (UDS)
Figure 15B:
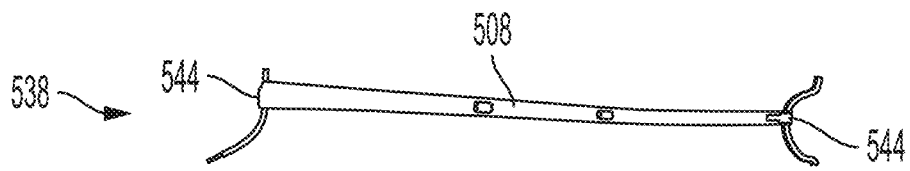
FIG. 15B shows a side view of the exemplary tubular structure of FIG. 15A.
Figure 15C:
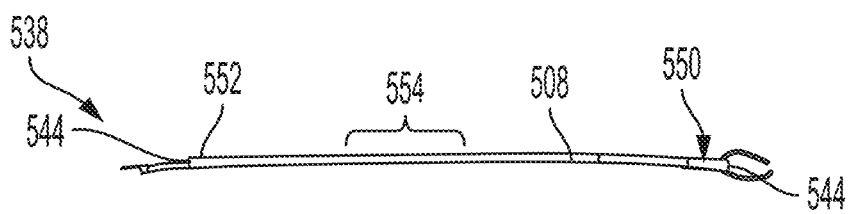
FIG. 15C shows a side view of the exemplary tubular structure of FIG. 15A.
Figures 15D, 15E:
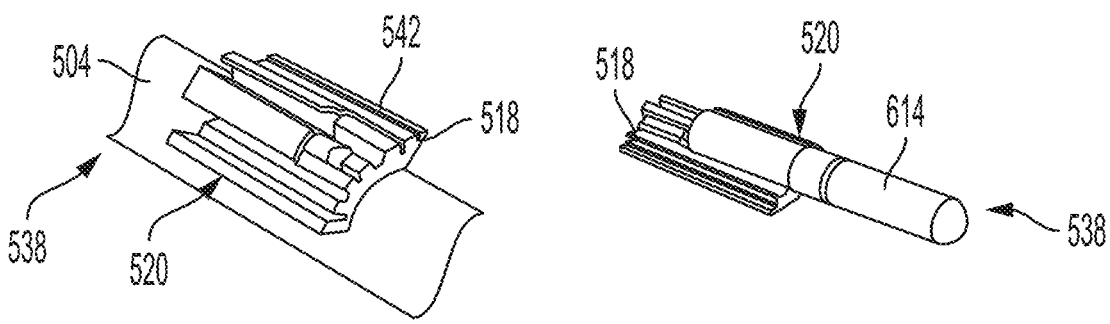
FIG. 15D is a perspective view of the exemplary sensor holder shown in FIG. 15A.
FIG. 15E is a perspective view of the sensor holder of FIG. 15A and a hydrophone sensor.
Figure 18:
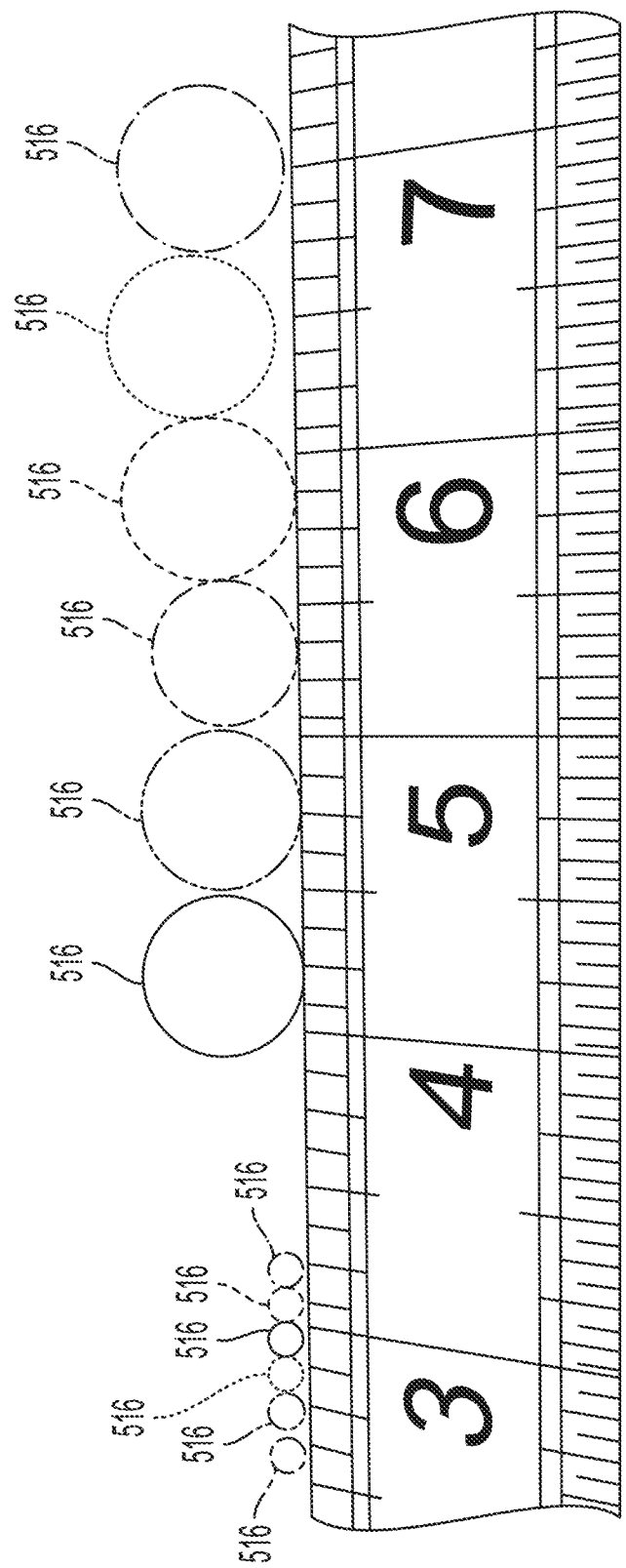
FIG. 18 shows a side view comparison of the measurement of dehydrated hydrogel beads against hydrogel beads in fully expanded form.

In examples, a UDS using physical-based expansion may include any number of elements, such as a 4-element design, and a 7-element design. FIGS. 15A-E show an exemplary 4-element UDS 538 using physical-based expansion. FIG. 15A shows a tubular structure 500 of the UDS, wherein the outer layer 504 is made with watertight Polyester film and the inner layer 506 (FIG. 16A) is a permeable sleeve 508 (FIG. 16A) fabricated from nylon and filled with hydrogel beads (FIG. 18). FIG. 15B shows the 4-element design's 538 tubular structure 500 may additionally include quadrant circular formation sensor holders 520, and a cable clamp 544. In some examples, the tubular structure 500 may also include barbered tube fitting 546 (FIG. 19B), and a pressure relief valve 548 (FIG. 19B). In some examples, a tube fitting is installed on a tail-end 552, and the pressure relief valve 548 is assembled on a head-end 550. FIG. 15C depicts both the head end 550 and tail end 552 sealed and tightened by cable clamps 544, with the remaining middle nodes 554 adhered to the tubular structure's 500 outer layer 504 (FIG. 15A). The 4-element design 538 may include a single permeable sleeve 508 (FIG. 11). FIGS. 15D and 15E show the circular formation 542 sensor holder 518. FIG. 15E shows the sensor holder 518 carrying an AQUARIAN 614 hydrophone. In some examples, the sensor holder 518 may carry a TELEDYNE 612 hydrophone (FIG. 19D).

Figure 16A:
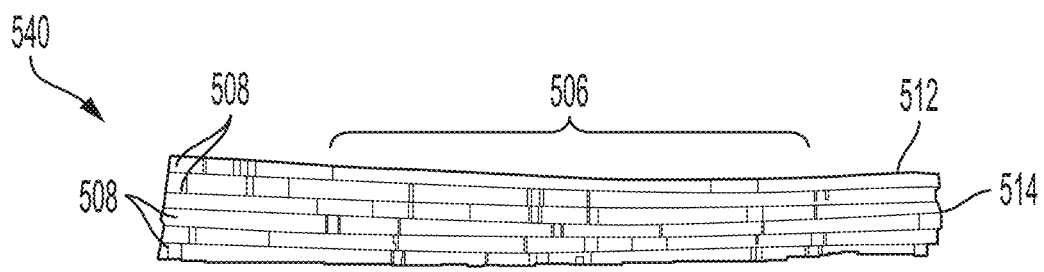
FIG. 16A shows a side view of an exemplary UDS.
Figure 16B:
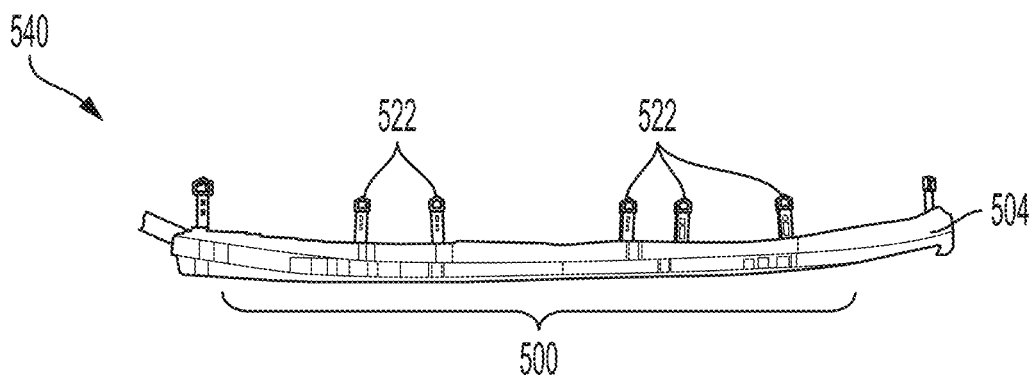
FIG. 16B shows a side view of the exemplary UDS of FIG. 16A.
Figure 16C:
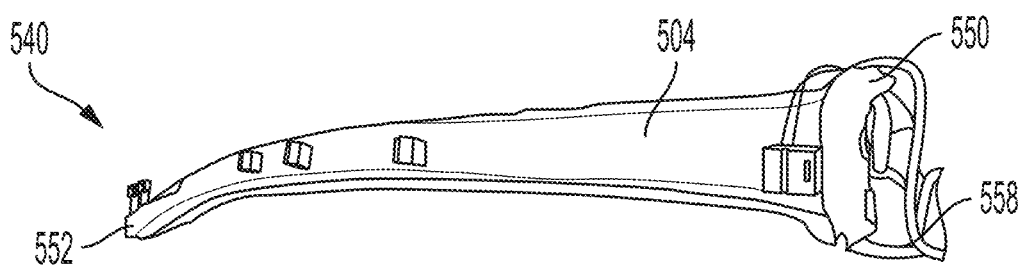
FIG. 16C shows a side view of the exemplary UDS of FIG. 16A with ropes.
Figure 16D:
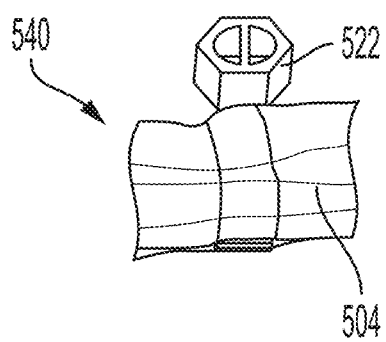
FIG. 16D shows a side view an exemplary sensor holder.
Figure 16E:
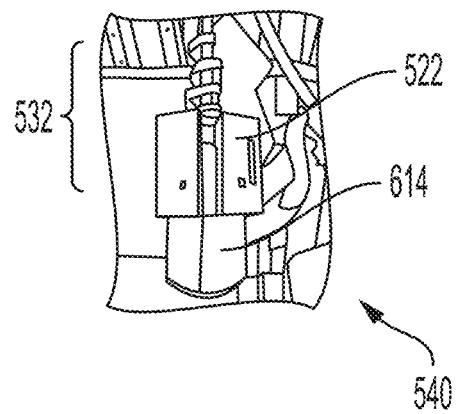
FIG. 16E shows a side view of the sensor holder of FIG. 16D.

FIGS. 16A-E show an exemplary 7-element UDS 540. The 7-element design 540 may include several permeable sleeves 508 (FIG. 16A). In certain examples, the permeable sleeves 508 may include nylon. In certain examples, the permeable sleeves 508 may include six permeable sleeves arranged in a pipe formation 512 (FIG. 16A). Each permeable sleeve 508 is shown adjacent another and wrapped in a circular formation with a hollow center area 514 (FIG. 16A). In certain examples of the 7-element design 540, horizontal configuration sensor holders 522 are utilized to reduce pre-expansion volume and permit easier storage. FIG. 16A shows the six permeable sleeves 508 in a pipe formation 512. FIG. 16B presents the fabricated tubular structure 500 formation with seven sensor holders 522, and FIG. 16C demonstrates the assembled UDS with ropes 558 on the head end 550 and tail end 552 to aid in deployment. FIGS. 16D and 16E show elevation views of the horizontal configuration sensor holder 522. FIG. 16E shows an exemplary sensor holder 522 having an L-shaped formation 532 and carrying a hydrophone 614.

Figure 17:
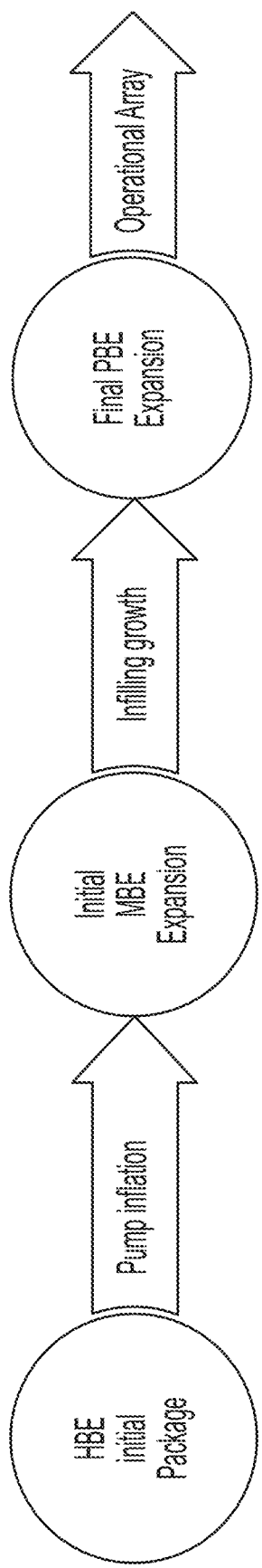
FIG. 17 is a schematic illustrating exemplary steps of a UDS expansion.

UDSs may also be deployed via a hybrid method of physical expansion and mechanical expansion. The approach may use a mechanical pump 600 (FIGS. 20A and 20B) to initially expand the UDS to the desired stiffness in combination with water swelling material. FIG. 17 illustrates a schematic drawing of the hybrid method of expansion, wherein a mechanical pump 600 (FIGS. 20A and 20B) expands the UDS structure within minutes and achieves the desired stiffness while water contacts the water swelling material infill. Once the water swelling material expands to the desired stiffness, the mechanical pump 600 may be turned off. Desired stiffness has been reached when the water swelling material reaches peak swelling and there is no slack to the tubular structure 500 (FIG. 19B). This approach enables rapid deployment with the expense of minimal energy, as the mechanical pump 600 (FIGS. 20A and 20B) is only utilized for the initial expansion phase. As a result, UDSs employing the hybrid method may use smaller pumps and smaller battery packs than those employing an entirely mechanical expansion method.

An example of a UDS with a hybrid expansion structure includes a tubular structure 500, wherein an outer layer 504 of the tubular structure 500 is made of watertight material and an inner layer 506 includes a permeable sleeve 508; a mechanical pump 600 (FIG. 20A); and water-swelling material. The mechanical pump 600 injects water into the tubular structure 500 to initially expand the structure and pressurize the structure against external forces. The mechanical pump 600 maintains this pressure while the water makes contact with the water swelling material, such as hydrogel beads 516 (FIG. 18). Once the water swelling material achieves desired expansion and rigidity, the mechanical pump 600 deactivates. Thus, while the hybrid expansion structure utilizes a hydraulic system for initial expansion, it eliminates the need for periodic inflation as is required with structures only using a mechanical pump 600 without water swelling material. UDS examples using hybrid-based expansion may use the same sensor holders 518 (FIGS. 12A-14D) and sensors 530 (FIG. 12B) as used with UDS examples using physical-based expansion.

Further, the hybrid method offers protection against potential punctures in the tubular structure's 500 outer layer 504. As the long-term rigidity of the UDS is achieved by the expansion of water swelling material within the inner layer 506, a UDS using a hybrid method of expansion may still stay inflated if a tear or puncture occurs in the outer layer 504. Punctures in the outer layer 504 occurring prior to full expansion only affect the speed of expansion, and punctures in the outer layer 504 occurring once the water swelling materials have achieved full expansion do not affect the structural integrity of the UDS. Full or predetermined expansion has occurred when the moisture-activated substance (e.g., hydrogel beads, foam) reach a level of expansion within the array where the array is not deformable, maintains its shape, and/or supports the UDS under water pressure and ocean forces at the underwater depth intended for the UDS, as understood by a skilled artisan.

An exemplary pressure test was performed on hydrogel beads used as water swelling material. Hydrogel bead performance was evaluated in a water pressure chamber at pressures equivalent to around 100 to 150 m depth, as the UDS is designed for deployment in shallow coastal water in a similar environment. The pressure chamber was then pressurized to reach 1241 kPa—equivalent to 125 m in depth. This pressure level was then maintained for six hours and the hydrogel beads' performance was observed. One set of hydrogel beads was also placed in a water cup under normal pressure as a control. The control hydrogel beads took eight hours to fully expand. The hydrogel beads in the pressure chamber fully expanded in approximately one hour. As a result, it was observed that increased ambient pressure accelerates the swelling process. The diameter of the fully swollen beads averaged approximately 15.8 mm. FIG. 18 shows a comparison of the hydrogel beads 516 after six hours in the pressure chamber against dry hydrogel beads 516. The diameters of the dry hydrogel beads 516 were approximately 3.2 mm as opposed to that of the swollen beads removed from the pressure chamber at approximately 14 mm. It was observed that the diameters of the fully swollen beads were the same regardless of the applied pressure. As a result, the use of hydrogel beads 516 was found to accelerate swelling time under increased pressure, maintain integrity over a long period of time, and provide approximately 80 times volume expansion.

In further examples, the UDS using hybrid-based expansion may include a plural-element design. Discussed examples may include a 4-element design and/or a 7-element design, yet the number of elements is not limited to either design. UDS components may be fabricated through fused deposition modeling (FDM). The watertight material forming the tubular structure's outer layer 504 was coated with epoxy to further seal the material. For example, FIGS. 19A-E show the 4-element hybrid-based expansion UDS 608 may include a dual-layer tubular structure 500 including an outer layer 504. The 4-element hybrid-based expansion UDS 608 also includes an inner layer 506 (FIG. 16A). The outer layer 504 may be made of watertight film, such as Polyester film, and the inner layer 506 includes a permeable sleeve 508 (FIG. 16A) made of a permeable material such as nylon. FIG. 19A shows the inner tube filled with water swelling material, in this example hydrogel beads 516 (FIG. 18). The outer layer 504 may be attached to the inner layer 506 at both ends with adhesive. Dry hydrogel beads 516 may be stored in a string of water-soluble paper bags 536 (FIG. 15A). FIG. 19B shows the 4-element hybrid-based expansion model 608 including a tubular structure 500 assembly having an outer layer 504 and an inner layer 506, circular sensor holders 542, cable clamps 544, barbed tube fitting 546, and a pressure relief valve 548. The outer layer 504 is sealed at both the head and tail ends 550, 552, leaving the tail end 552 connected with the barbered tube-fitting 546 for water inflation and the head end 550 connected with the pressure relief valve 548 for ventilation of trapped gas. FIG. 19C shows the 4-element hybrid-based expansion model 608 with both ends sealed and tightened by the cable clamps 544 (FIG. 19B), while the remaining circular sensor holders 542 are adhered to the outer layer 504. The circular sensor holder 542 may be designed to carry two types of hydrophone sensors. In certain examples, the two types of hydrophone sensors may include the TELEDYNE RESON TV 4013 sensor and the AQUARIAN H2a sensor. FIG. 19D shows the TELEDYNE sensor 612 and FIG. 19E shows the AQUARIAN sensor 614.

Figure 20A:
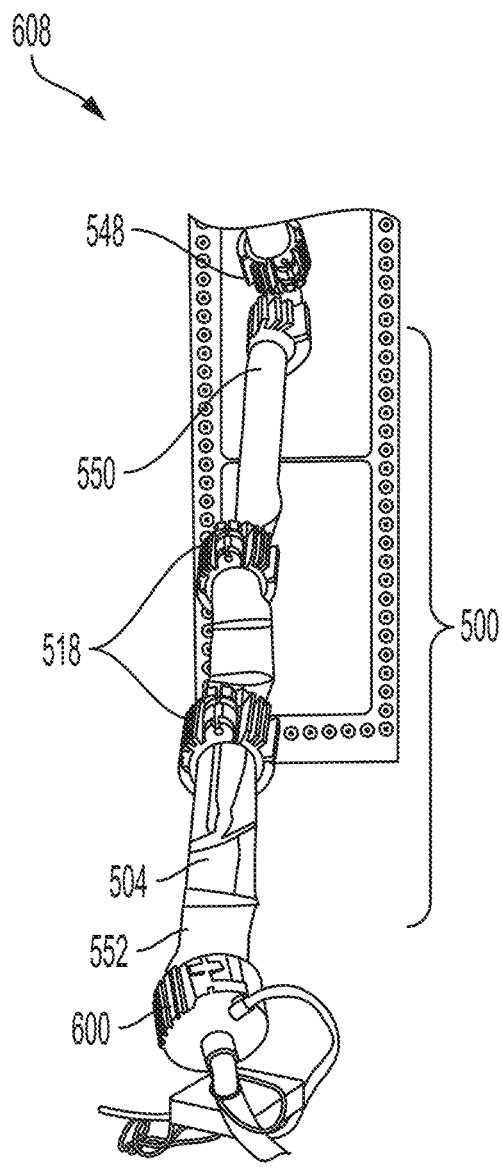
FIG. 20A is a perspective view of an exemplary pre-expansion UDS.
Figure 20B:
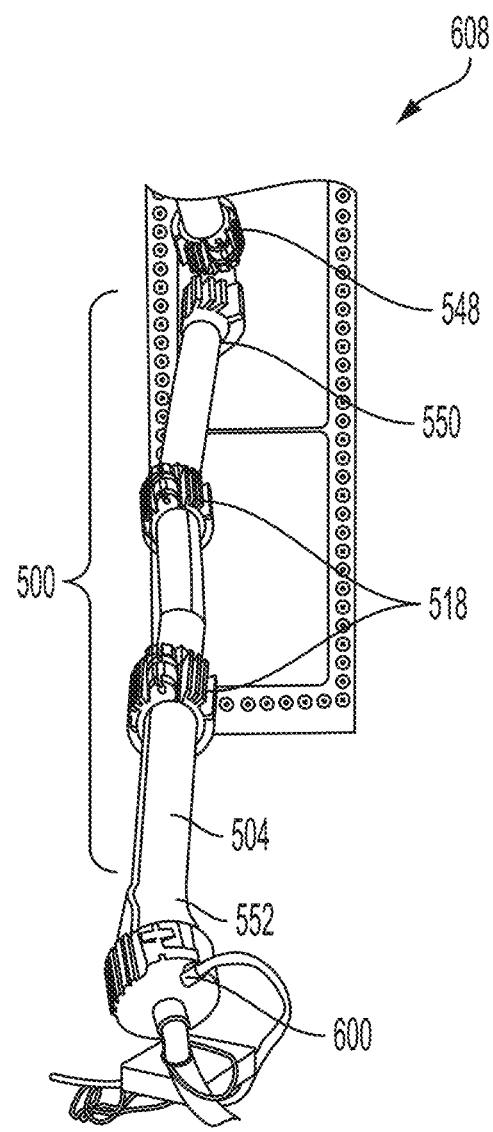
FIG. 20B is a perspective view illustrating the UDS of FIG. 20A post-expansion.

FIGS. 20A and B show an exemplary expansion process of the 4-element hybrid-based expansion UDS 608. The UDS using hybrid-based expansion is connected to an underwater mechanical pump 600 at the tail end 552 for water injection and a pressure relief valve 548 at the head end 550 to permit water flow from bottom to top and ensure the inner layer's 506 (FIG. 16A) hydrogel-filled permeable sleeve 508 (FIG. 16A) is submerged. FIG. 20A illustrates an initial flat state of the tubular structure 500. FIG. 20B shows the tubular structure's 500 increased stiffness and volume once the mechanical pump 600 injects water into the tubular structure 500 and the pressure differential changes. After the hydrogel beads 516 (FIG. 18) have achieved complete expansion, the UDS may operate as a sensing node.

Figure 21:
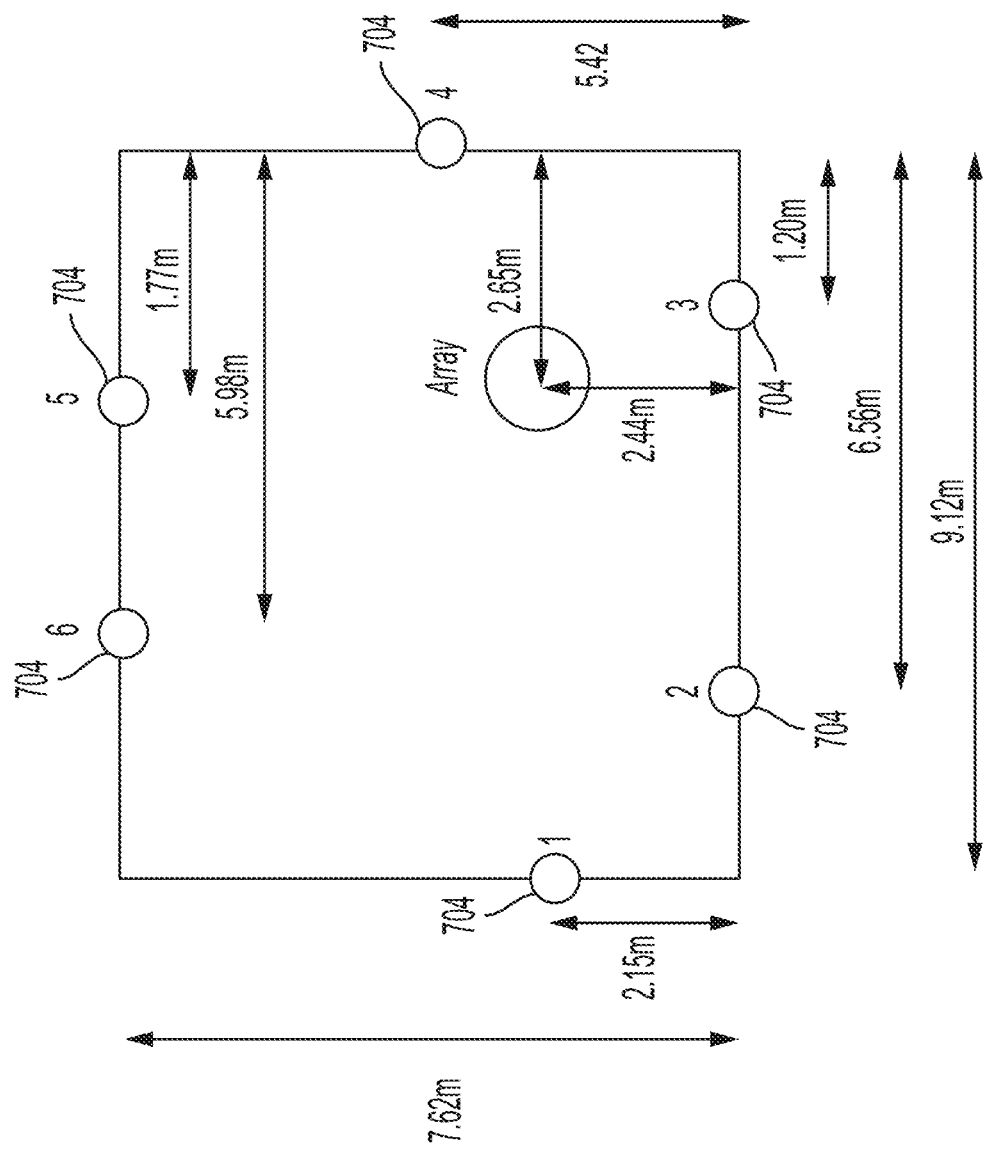
FIG. 21 shows a diagram illustrating an aerial view of signal sources in relation to the 4-element hybrid-based expansion UDS during an acoustic test.

An exemplary acoustic test was conducted. The 4-element hybrid-based expansion UDS was deployed in an acoustic tank having dimensions about 9 m×7.5 m×9 m. The UDS was attached to the side of a catwalk on the test tank and deployed vertically in the tank with the first of the four elements at a depth of about 0.22 m. 4-element and 7-element physical-based expansion UDSs were also deployed. FIG. 21 illustrates the dimensions of the environmental geometry layout during the acoustic tests. A wireless waterproof bluetooth speaker 704 was used as the signal source, which was positioned at six different locations, marked 1 through 6 in FIG. 21. The source signal in the exemplary test was a sinusoid of about 2.5 kHz. The received signal was sampled at a sampling frequency of about 96 kHz, and a data logger (e.g., Zoom H6) was used to record the received data.

A study was conducted regarding the performance of the fully expanded UDS against external forces, such as ocean currents. As UDSs with hybrid-based expansion primarily differ from those using physical-based expansion by virtue of having a mechanical pump 600 for initial inflation, the structures of the hybrid-based expansion and physical-based expansion UDSs demonstrate the same response under the same dimensions. Thus, only the physical-based expansion UDS was tested in addition to UDSs using chemical-based expansion and mechanical-based expansion. Each model was tethered with a buoy on top and moored on the seafloor. Although all UDS structures drifted with a slight curvature along the array length in the direction of the ocean current, each UDS maintained the hydrophone sensors 556 at the desired locations.

Figure 22:
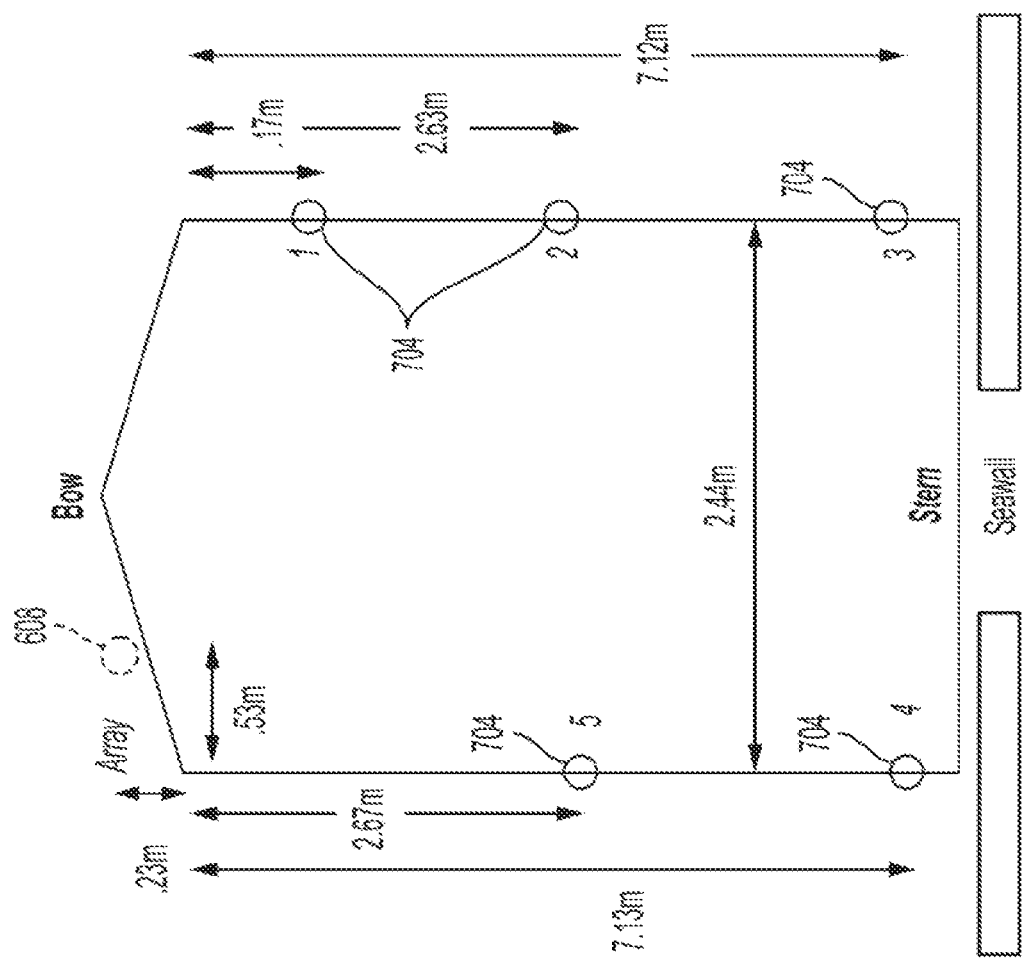
FIG. 22 is a diagram illustrating an aerial view of speaker locations relative to a UDS during a field acoustic test.

A field test was also conducted of a fully expanded 7-element physical-based expansion UDS 540 (FIG. 19A) to determine its resistance against wildlife and ocean debris. The prototype used in the field test was the same prototype used in the pressurized chamber study, as the water swelling material 502 infilling had the opportunity to shrink back down to its initial volume through dehydration. The distance between the first hydrophone 556 to the second hydrophone 556 on the 7-element physical-based expansion UDS 540 was about 1.92 m. However, the length of the overall UDS was 2 m, leaving space on both ends for lift and weight installation. The deployment site was selected based on the need to have a depth of over 4.5 m and adequately submerge the entire array. Due to time constraints, the UDS was pre-expanded prior to the field test. The UDS was then deployed at an area of 5.18 m in depth. An acoustic test was then conducted in which waterproof speakers 704 were deployed pointing at the array at about 0.5 m depth and operating at a central frequency of about 2.5 kHZ, as this frequency is within the hearing spectrum of dolphins and manatees near the deployment site. The experimental layout of the acoustic tests is shown in FIG. 22 showing the speaker 704 locations in relation to the UDS 608. At each location, a monochromatic measurement was taken where the speaker 704 played a lopped 2.5 kHz single tone as well as a multi-frequency measurement wherein the speaker 704 emitted a chirp signal of a bandwidth of about 300 Hz centered at 2.5 kHz. The data was recorded by the deployed array using two data loggers with a sampling frequency of 96 KHz.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An underwater deployable structure device, comprising:
   an underwater deployable structure;
   an array attached to the underwater deployable structure, wherein the array includes a tubular structure including an outer layer with hallowed sections therein each defining a cavity well, the outer layer maintaining the form of the tubular structure; and
   moisture-activated substance located in at least one of the cavity wells, wherein the moisture-activated substance comprises a water swelling material that expands upon contact with water and shrinks back to its original volume when dehydrated.

2. The underwater deployable structure device of claim 1, the tubular structure further includes a permeable sleeve having the outer layer and an inner layer attached to the outer layer and defining a cavity well within.

3. The underwater deployable structure device of claim 2, further comprising a mechanical pump, wherein the mechanical pump is configured to pump water into the cavity wells of the array.

4. The underwater deployable structure device of claim 1, further comprising a pressure relief valve, wherein the pressure relief valve is configured to release trapped gasses from within the array.

5. The underwater deployable structure device of claim 1, wherein the outer layer includes watertight material.

6. The underwater deployable structure device of claim 1, further comprising at least one anchor configured for attachment to an underwater seabed.

7. The underwater deployable structure device of claim 1, wherein the array is a buoyance container attached to the underwater deployable structure, the buoyance container including the moisture-activated substance therein being expandable in volume from an unexpanded state to an expanded state via contact with the moisture.

8. The underwater deployable structure device of claim 1, wherein the expanded moisture-activated substance is lighter than water and configured to raise the underwater deployable structure from a first underwater depth to a second underwater depth shallower than the first underwater depth.

9. The underwater deployable structure device of claim 1, wherein the water swelling material comprises a water-absorbent polymer.

10. The underwater deployable structure device of claim 1, wherein the water swelling material comprises hydrogel beads configured to expand by more than 50 times in volume when in contact with water.

11. The underwater deployable structure device of claim 1, wherein in a pre-expansion state, the water swelling material is dispersed in a water-soluble substrate.

12. The underwater deployable structure device of claim 1, further comprising a sensor.

13. The underwater deployable structure device of claim 12, wherein the sensor comprises an acoustic sensor.

14. The underwater deployable structure device of claim 12, wherein the sensor is coupled to the underwater deployable structure by a sensor holder, wherein the sensor holder defines a circular configuration at least partially surrounding the underwater deployable structure.

15. The underwater deployable structure device of claim 14, wherein the sensor holder comprises one or more grips configured to secure the sensor to the sensor holder.

16. The underwater deployable structure device of claim 1, further comprising a robotic manipulator.

* * * * *